US011527915B2

(12) United States Patent
Omori et al.

(10) Patent No.: US 11,527,915 B2
(45) Date of Patent: Dec. 13, 2022

(54) WIRELESS ELECTRICAL TRANSFER WITH ZERO VOLTAGE SWITCHING POWER SUPPLY APPARATUS

(71) Applicants: Nichicon Corporation, Kyoto (JP); JOSHO GAKUEN EDUCATIONAL FOUNDATION, Osaka (JP)

(72) Inventors: Hideki Omori, Osaka (JP); Masahito Tsuno, Kyoto (JP); Masashi Yamaguchi, Kyoto (JP)

(73) Assignees: Nichicon Corporation, Kyoto (JP); Josho Gakuen Educational Foundation, Osaka (JP)

( * ) Notice: Subject to any disclaimer, the term of this patent is extended or adjusted under 35 U.S.C. 154(b) by 0 days.

(21) Appl. No.: 17/290,635

(22) PCT Filed: Nov. 1, 2019

(86) PCT No.: PCT/JP2019/043033
§ 371 (c)(1),
(2) Date: Apr. 30, 2021

(87) PCT Pub. No.: WO2020/091042
PCT Pub. Date: May 7, 2020

(65) Prior Publication Data
US 2022/0037926 A1  Feb. 3, 2022

(30) Foreign Application Priority Data

Nov. 2, 2018  (JP) .............................. JP2018-207094
Aug. 16, 2019  (JP) .............................. JP2019-149449
Oct. 3, 2019  (JP) .............................. JP2019-183023

(51) Int. Cl.
*H02J 50/12* (2016.01)
*H02J 50/80* (2016.01)
*H02J 50/40* (2016.01)

(52) U.S. Cl.
CPC ............ *H02J 50/12* (2016.02); *H02J 50/402* (2020.01); *H02J 50/80* (2016.02)

(58) Field of Classification Search
CPC ............. H02J 50/00; H02J 50/12; H02J 50/80
See application file for complete search history.

(56) References Cited

U.S. PATENT DOCUMENTS 8,947,041 B2 *  2/2015  Cook ...................... H02J 50/00
320/108
10,090,709 B2  10/2018  Matsumoto et al.
(Continued)

FOREIGN PATENT DOCUMENTS

JP  2012-065484 A  3/2012
JP  6038386 B1  12/2016

OTHER PUBLICATIONS

Hideki Omori et al, "A New Resonant IPT-Wireless EV Charging System with Single-Ended Quasi-Resonant Inverter for Home Use" , Oct. 10, 2013, 2013 IEEE 14th Workshop on Control and Modeling for Power Electronics (COMPEL), pp. 1-6. (Year: 2013).*
(Continued)

*Primary Examiner* — Adi Amrany
(74) *Attorney, Agent, or Firm* — Muncy, Geissler, Olds & Lowe, P.C.

(57) ABSTRACT

A wireless electrical power supply apparatus 100 includes a first electrical power supply unit 101, a second electrical power supply unit 104, voltage control circuits 113 and 123 configured to control a first voltage difference between a first input voltage $E_1$ and a first output voltage $E_2$ during forward power transmission and a second voltage difference between a second input voltage $E_2$ and a second output voltage $E_1$ during reverse power transmission, a second switching control circuit 121, 122 configured to turn off a second transistor $Q_2$ during the forward power transmission and thereby cause a second diode $D_2$ to perform rectification, and
(Continued)

a first switching control circuit 111, 112 configured to turn off a first transistor $Q_1$ during the reverse power transmission and thereby cause a first diode $D_1$ to perform rectification.

1 Claim, 15 Drawing Sheets

(56) References Cited

U.S. PATENT DOCUMENTS

| | | | | |
|---|---|---|---|---|
| 2008/0094146 A1* | 4/2008 | Huang | ............... | H03L 7/087 |
| | | | | 331/1 A |
| 2011/0254377 A1* | 10/2011 | Wildmer | ........... | H02J 7/007182 |
| | | | | 307/104 |
| 2012/0169131 A1 | 7/2012 | Choudhary et al. | | |
| 2012/0235636 A1* | 9/2012 | Partovi | ............... | H04B 5/0081 |
| | | | | 320/108 |
| 2013/0301308 A1* | 11/2013 | Hosotani | ............. | H02M 3/3381 |
| | | | | 363/21.03 |
| 2015/0015081 A1* | 1/2015 | Usami | ............... | H02M 3/01 |
| | | | | 307/104 |
| 2015/0214788 A1* | 7/2015 | Hosotani | ................. | H02J 50/12 |
| | | | | 307/104 |
| 2015/0263511 A1* | 9/2015 | Sandner | ............... | H02H 7/1252 |
| | | | | 363/53 |
| 2015/0349573 A1* | 12/2015 | Tschirhart | ............... | H02J 50/12 |
| | | | | 320/108 |
| 2016/0220814 A1* | 8/2016 | Chiao | ................... | A61N 1/3756 |
| 2017/0117755 A1* | 4/2017 | Muratov | ................. | H02J 50/60 |
| 2017/0214278 A1* | 7/2017 | Hosotani | ................. | H02J 50/70 |
| 2017/0229921 A1* | 8/2017 | Hwang | ................. | H03F 3/2173 |
| 2017/0317531 A1* | 11/2017 | Kato | ....................... | H02J 50/90 |
| 2017/0324343 A1* | 11/2017 | Ishigaki | ............. | H02M 3/33584 |
| 2018/0054090 A1* | 2/2018 | Von Novak, III | ...... | H02J 7/025 |
| 2018/0287432 A1* | 10/2018 | Wang | ................... | G01S 7/2922 |
| 2021/0359551 A1* | 11/2021 | Yankowitz | ............... | H03F 3/30 |

OTHER PUBLICATIONS

Kuroda et al., "A Wireless V2H Apparatus with a New SiC-MOSFET and Unique Bidirectional Controlled Single-Ended Converter," 2017 IEEE $3^{rd}$ Int'l Future Energy Electronics Conf. & ECCE Asia, pp. 298-303 (2017).

* cited by examiner

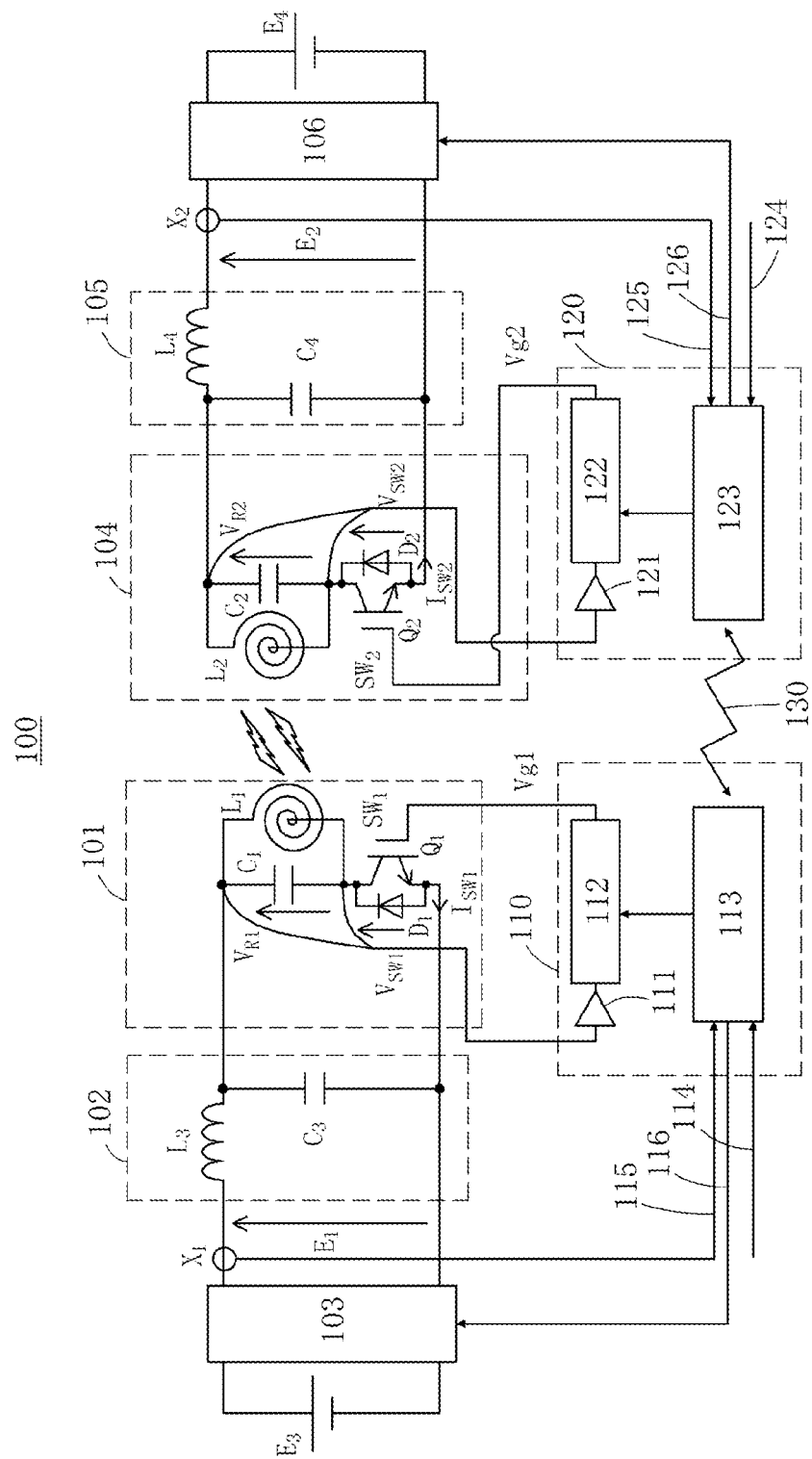
[Fig. 1]

[Fig. 2]
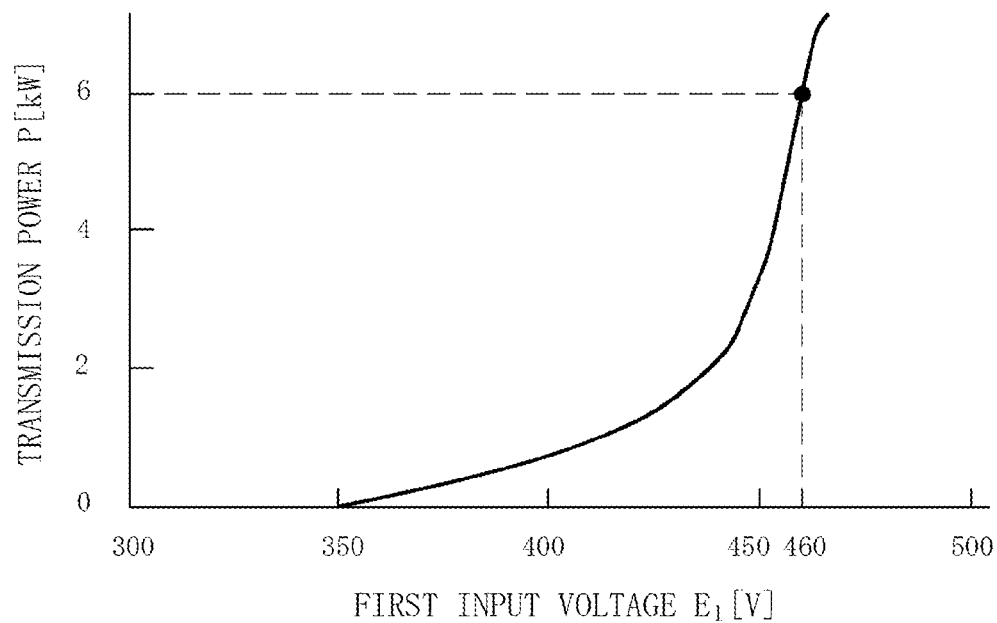
[Fig. 3]
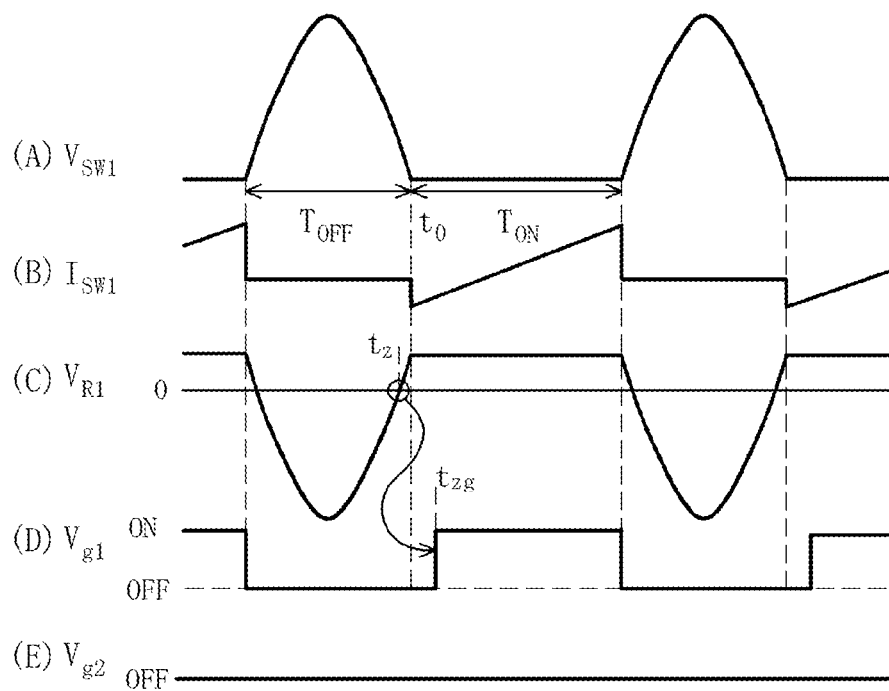

[Fig. 4]
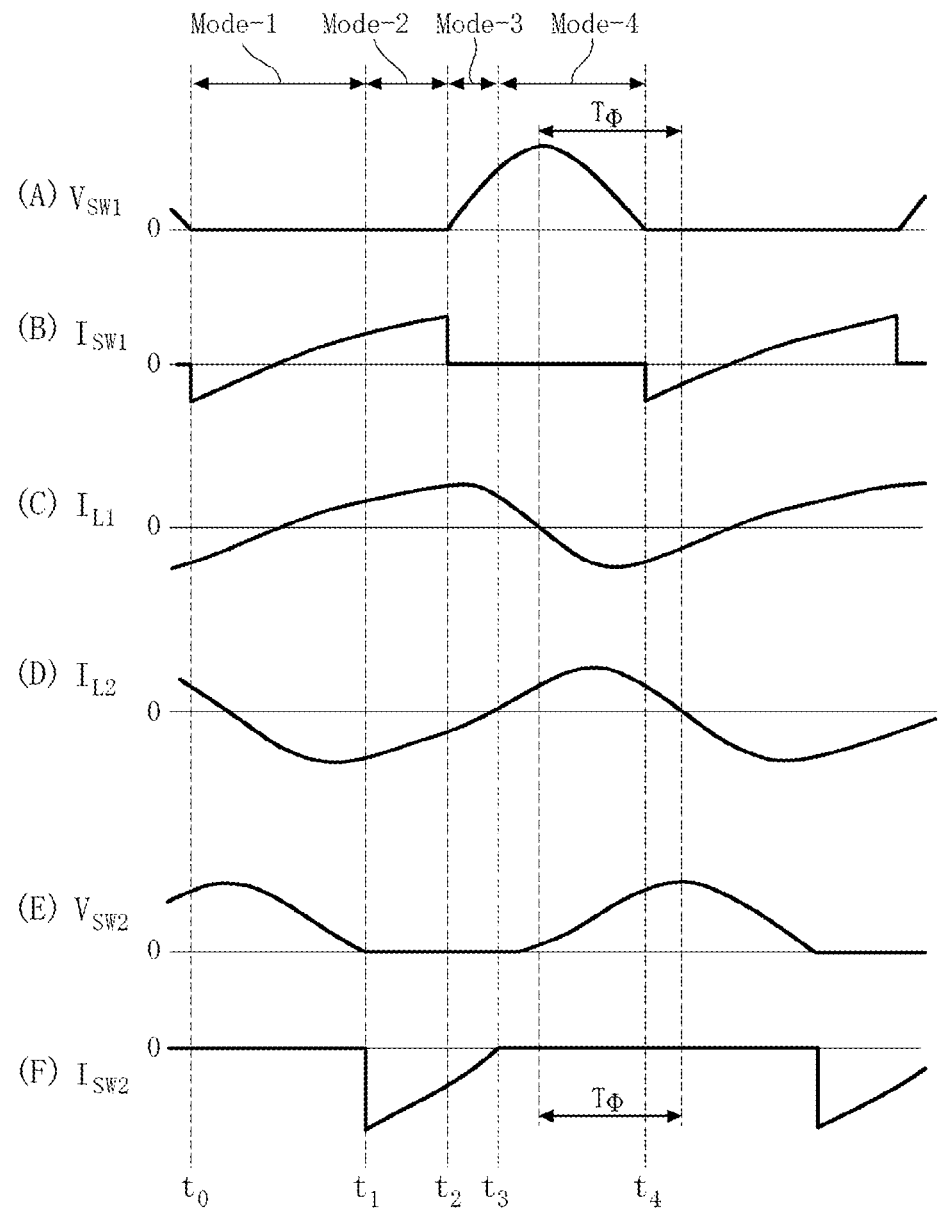

[Fig. 5]
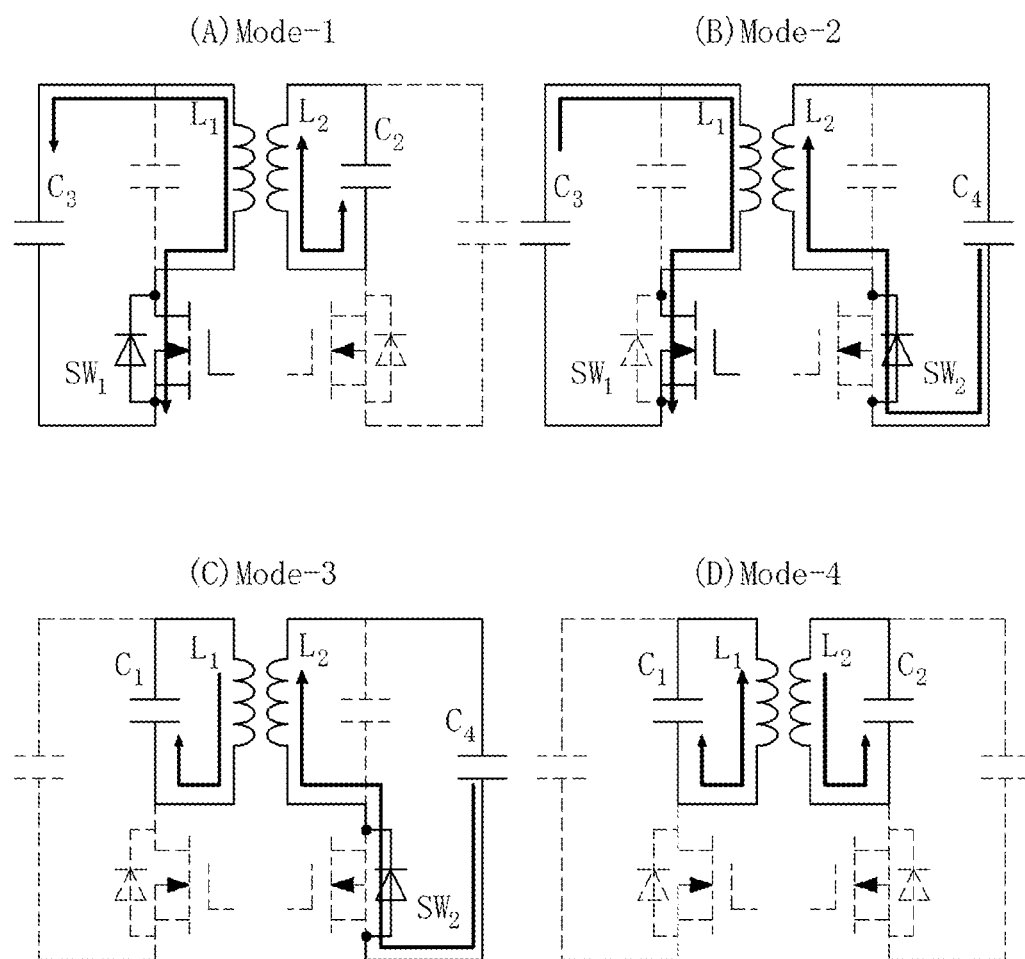

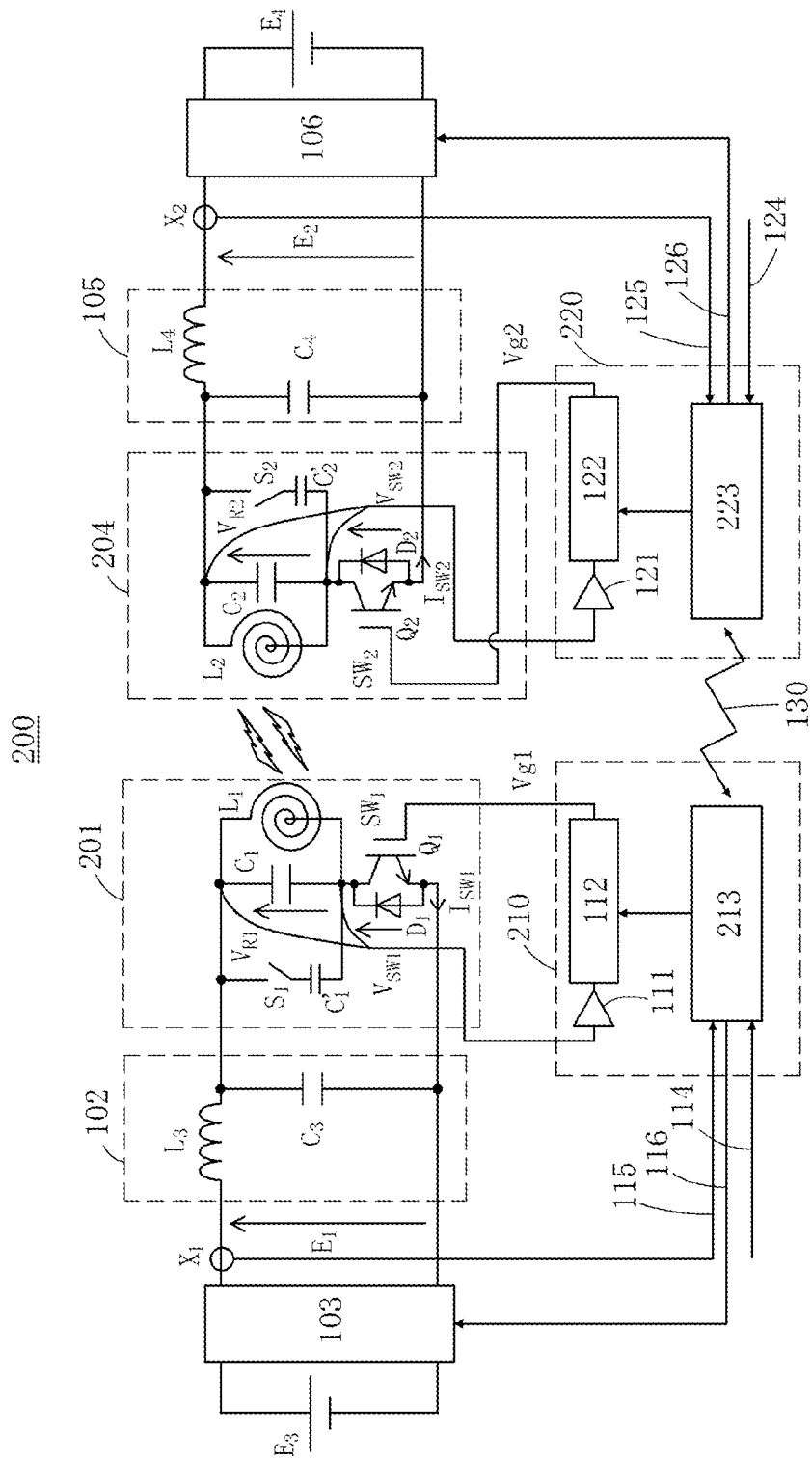
[Fig. 6]

[Fig. 7]
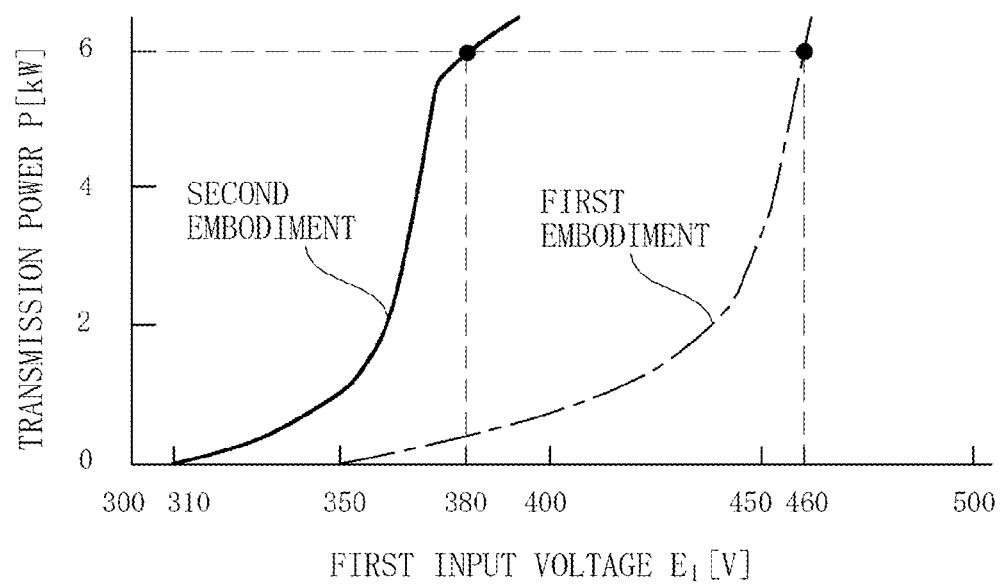

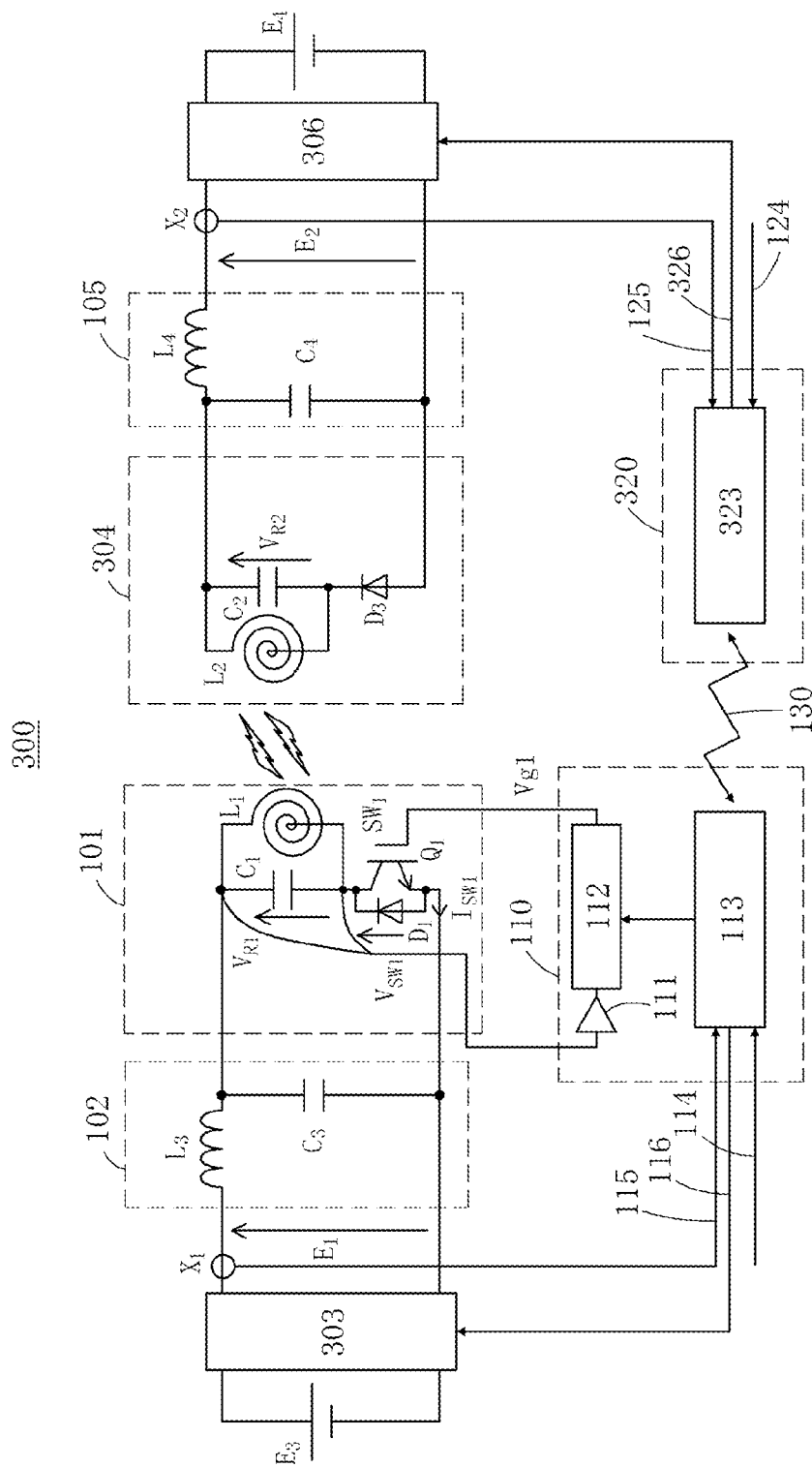
[Fig. 8]

[Fig. 9]
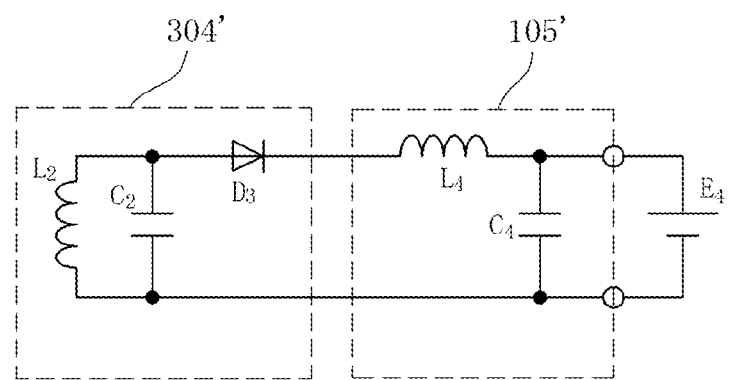

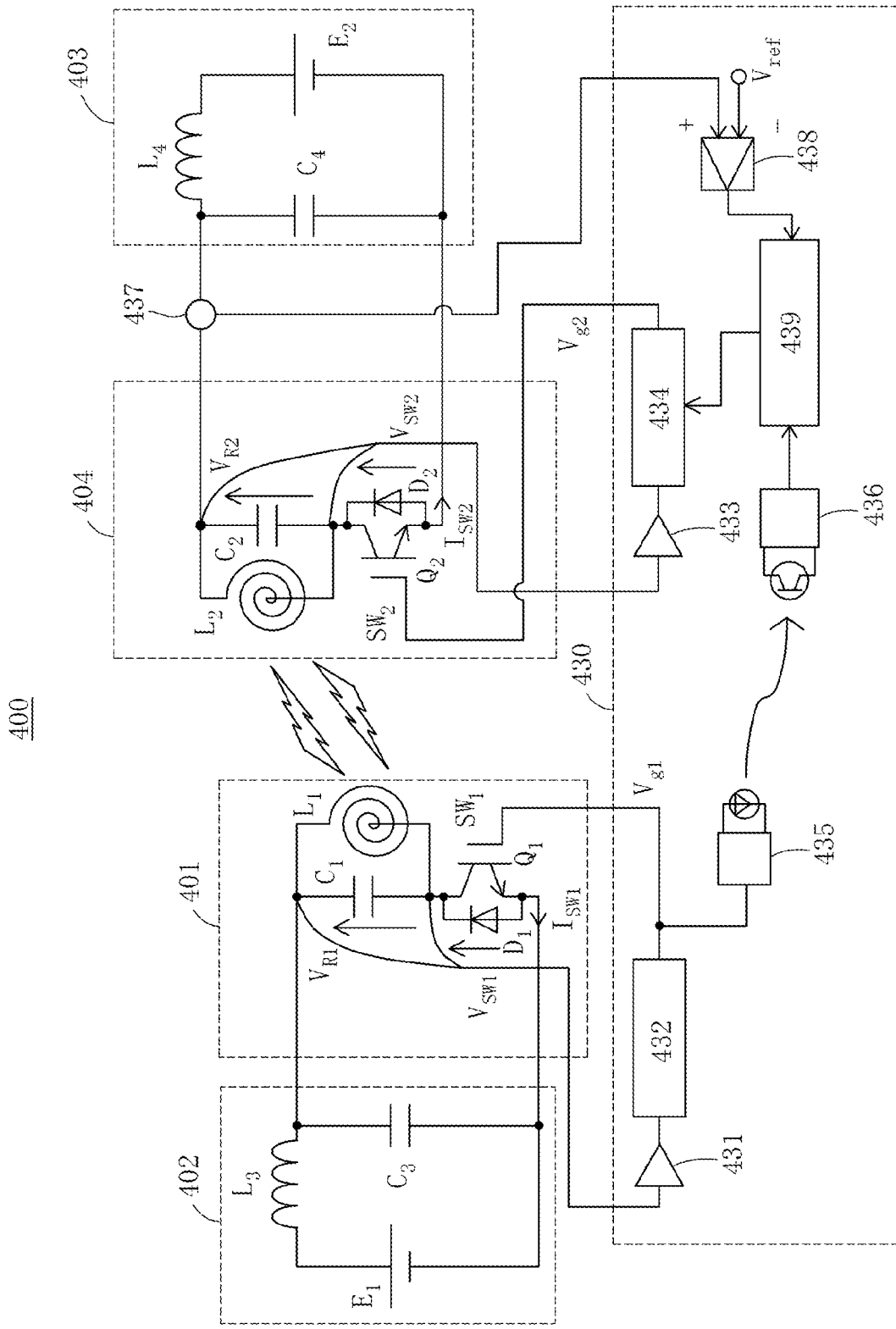
[Fig. 10]

[Fig. 11]
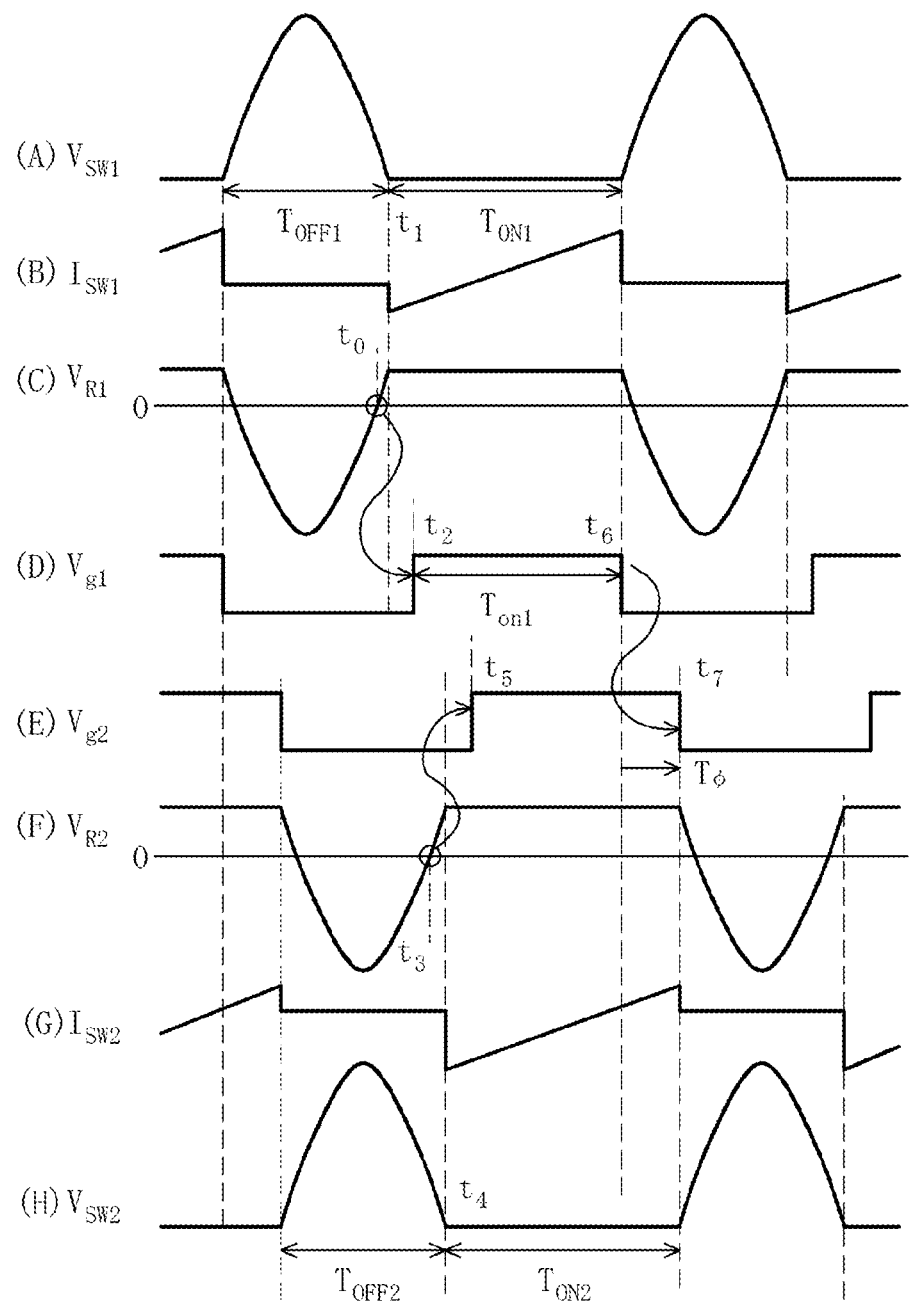

[Fig. 12]
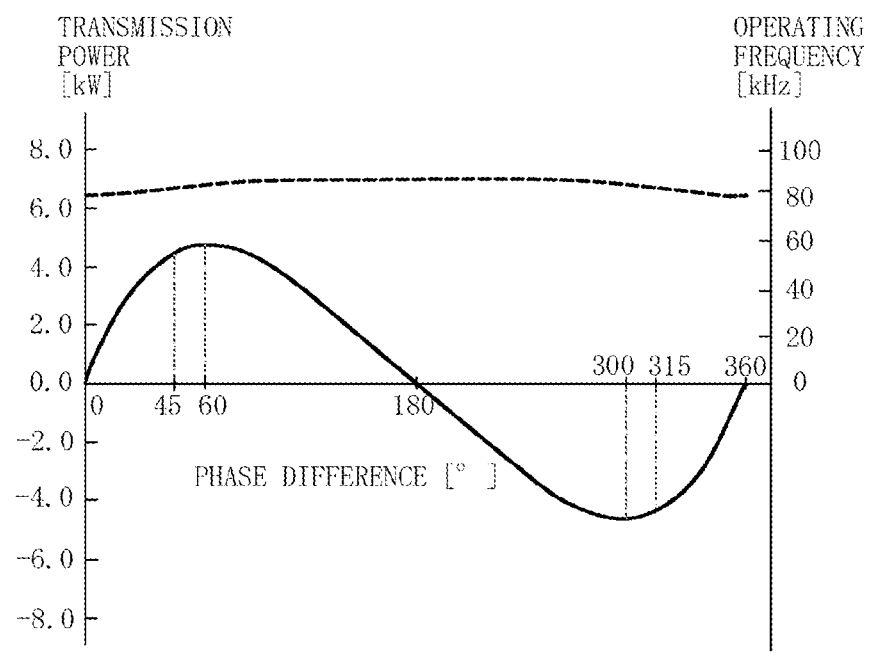

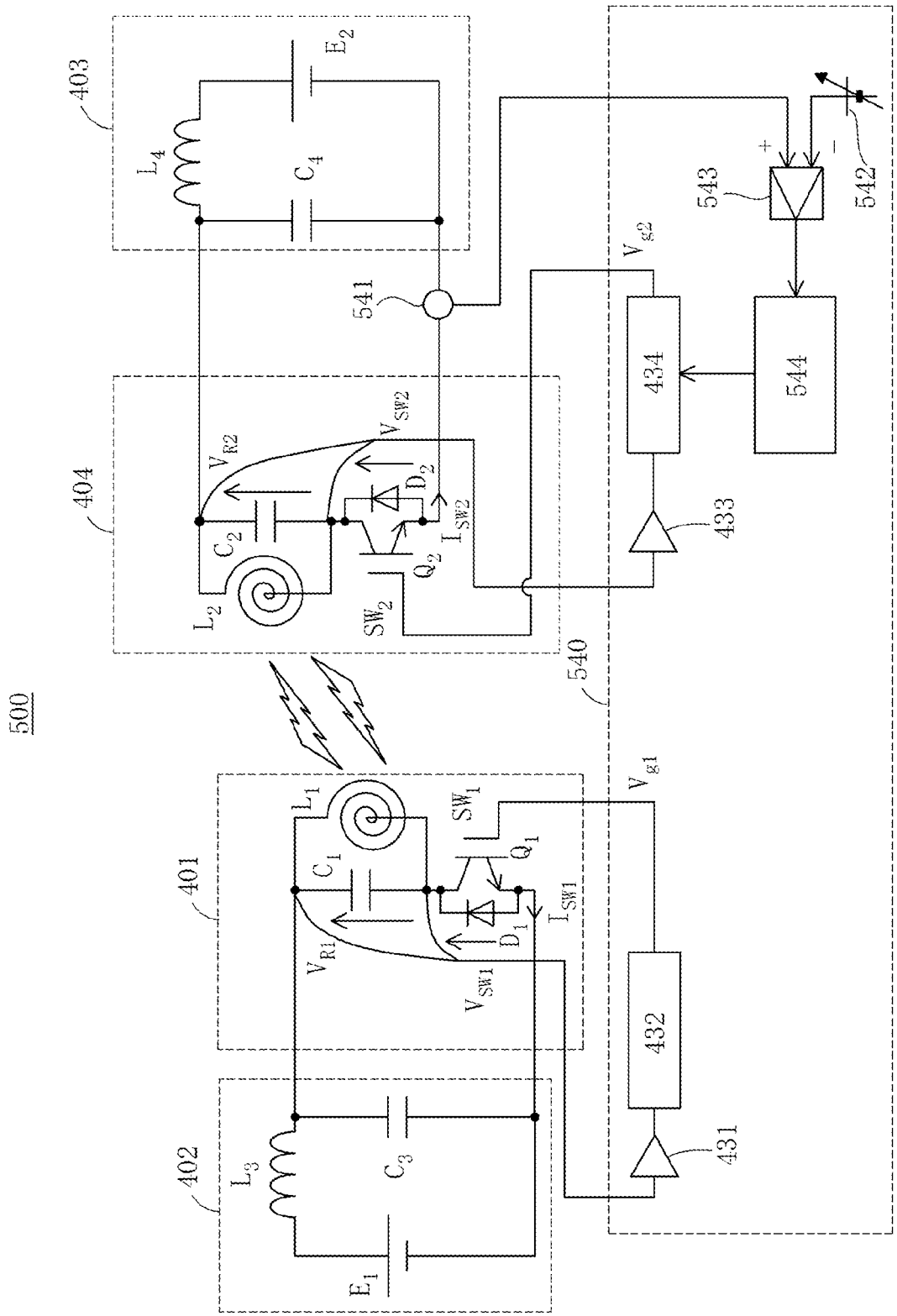
[Fig. 13]

[Fig. 14]
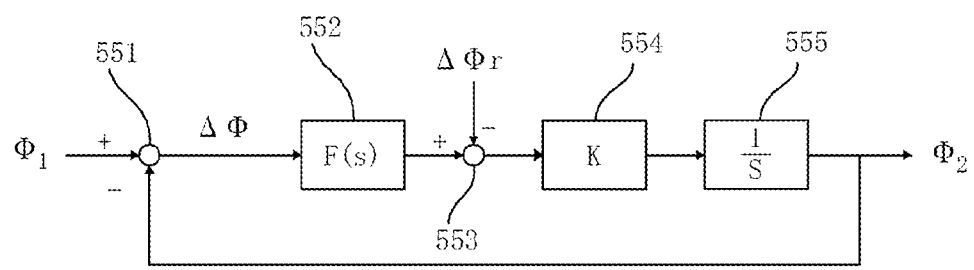

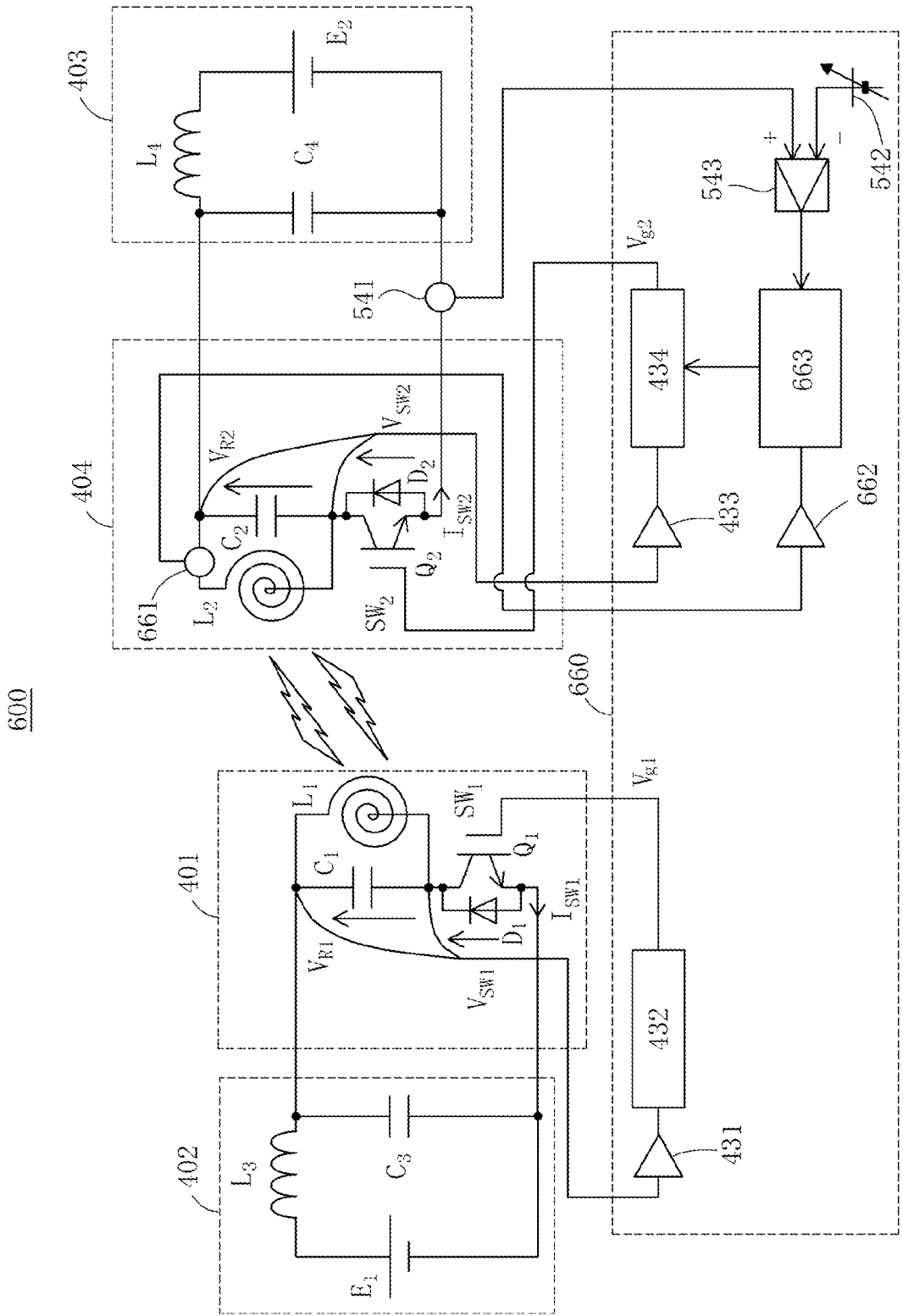
[Fig. 15]

[Fig. 16]
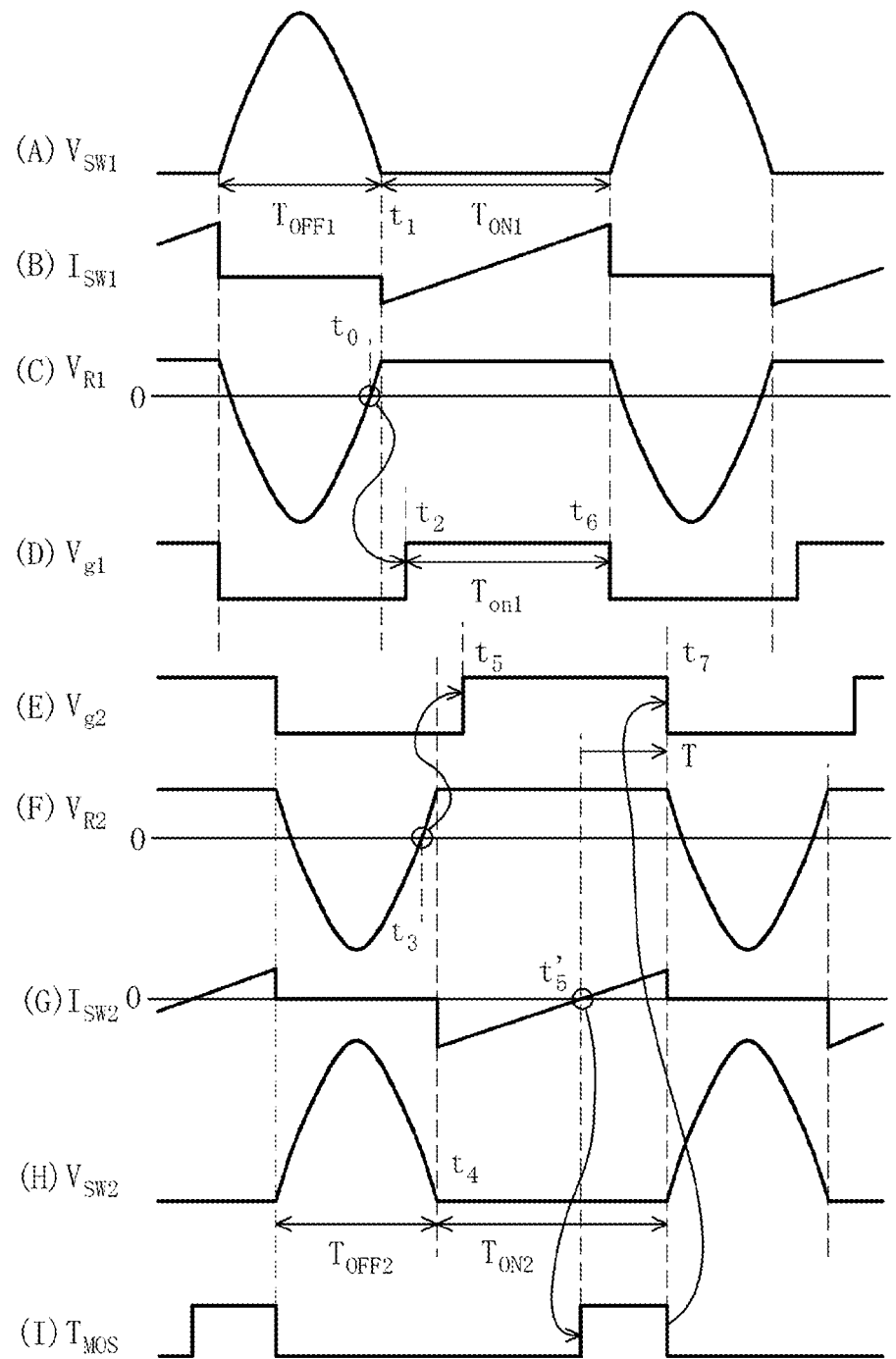

WIRELESS ELECTRICAL TRANSFER WITH ZERO VOLTAGE SWITCHING POWER SUPPLY APPARATUS

CROSS REFERENCE TO RELATED APPLICATIONS

This nonprovisional application is a National Stage of International Application No. PCT/JP2019/043033, which was filed on Nov. 1, 2019, and which claims priority to Japanese Patent Application No. 2018-207094, which was filed in Japan on Nov. 2, 2018, Japanese Patent Application No. 2019-149449, which was filed in Japan on Aug. 16, 2019, and Japanese Patent Application No. 2019-183023, which was filed in Japan on Oct. 3, 2019, and which are all herein incorporated by reference.

TECHNICAL FIELD

The present invention relates to a wireless electrical power supply apparatus.

BACKGROUND ART

In general, wireless electrical power supply apparatuses are used in bidirectional power transmission systems (e.g., V2H (Vehicle to Home) or V2G (Vehicle to Grid) systems) between electricity-powered vehicles, such as electric vehicles and plug-in hybrid vehicles, and residential buildings or power distribution systems. The wireless electrical power supply apparatus performs power transmission utilizing magnetic coupling between coils and therefore eliminates the need for a cable connection with an electricity-powered vehicle.

Patent Document 1 discloses a wireless electrical power supply apparatus including inverter circuits (full bridge or half bridge) in which coils and capacitors connected in series, and converters connected to the inverter circuits. The wireless electrical power supply apparatus performs control such that the converter on the transmitter side receives constant input power, and the converter on the receiver side outputs maximum power.

In the wireless electrical power supply apparatus described in Patent Document 1, the inverter circuits on the transmitter and receiver sides are bridge circuits, each consisting of a plurality of power semiconductors, and therefore tend to be high-cost and large-sized. Moreover, the wireless electrical power supply apparatus described in Patent Document 1 requires complicated control on both the transmitter and receiver sides at the start of and during power supply.

On the other hand, Non-Patent Document 1 discloses a wireless electrical power supply apparatus including single-switch converters serving as transmitter-side and receiver-side power supply units. This wireless electrical power supply apparatus can be significantly reduced in cost and size compared to the wireless electrical power supply apparatus described in Patent Document 1.

PRIOR ART DOCUMENT

Patent Document

Patent Document 1: Published Japanese Patent No. 6038386

Non-Patent Document

Non-Patent Document 1: "A Wireless V2H Apparatus with a New SiC-MOSFET and Unique Bidirectional Controlled Single-Ended Converter", Hideki Omori and seven others, Jul. 27, 2017, IEEE [searched online Oct. 24, 2018], <URL: https://umexpert.um.edu.my/file/publication/00005361_159948_71519.pdf>

DISCLOSURE OF THE INVENTION

Problems to be Solved by the Invention

However, in the case of the wireless electrical power supply apparatus described in Non-Patent Document 1, transmission power fluctuates due to variations of circuit constants (e.g., variations of constants among transmission coils and resonant capacitors), resulting in problems to mass production and compatibility. Accordingly, for practical use, the wireless electrical power supply apparatus described in Non-Patent Document 1 is required to be improved at least in terms of stability of transmission characteristics.

The present invention has been achieved under the above circumstances, with a problem thereof being to provide a wireless electrical power supply apparatus capable of enhancing the stability of transmission characteristics while realizing reductions in cost and size of the apparatus.

Solution to the Problems

To solve the above problem, the present invention, in an embodiment, provides a wireless electrical power supply apparatus including: a first electrical power supply unit including a first transmission coil, a first switching device including a first transistor connected in series to the first transmission coil and a first diode connected in anti-parallel to the first transistor, and a first resonant capacitor connected in parallel to either the first transmission coil or the first switching device, or both; a second electrical power supply unit including a second transmission coil, a second switching device including a second transistor connected in series to the second transmission coil and a second diode connected in anti-parallel to the second transistor, and a second resonant capacitor connected in parallel to either the second transmission coil or the second switching device, or both; a first switching control circuit configured to control turn-off of the first switching device and also control turn-on of the first switching device in synchronization with a resonant voltage in the first electrical power supply unit such that the first switching device performs a zero-voltage switching operation; a second switching control circuit configured to control turn-off of the second switching device and also control turn-on of the second switching device in synchronization with a resonant voltage in the second electrical power supply unit such that the second switching device performs a zero-voltage switching operation; and a voltage control circuit configured to control a first voltage difference between a first input voltage to the first electrical power supply unit and a first output voltage from the second electrical power supply unit during forward power transmission from the first electrical power supply unit to the second electrical power supply unit, and also control a second voltage difference between a second input voltage to the second electrical power supply unit and a second output voltage from the first electrical power supply unit during reverse power transmission from the second electrical power supply unit to the first electrical power supply unit, wherein the second switching control circuit turns off the second transistor during the forward power transmission and thereby causes the second diode to perform rectification, and the first switching control circuit turns off the first transistor during the reverse power transmission and thereby causes the first diode to perform rectification.

In this configuration, the first electrical power supply unit is a single-switch converter actuated by the first switching device, and the second electrical power supply unit is a single-switch converter actuated by the second switching device, whereby reductions in cost and size of the apparatus can be realized.

Furthermore, in this configuration, the first and second switching control circuits turn off the transistors on the receiver side and thereby cause the diodes to perform rectification, and the voltage control circuit controls the difference between the input and output voltages, whereby transmission power fluctuations due to variations of circuit constants can be compensated for. Thus, this configuration renders it possible to enhance the stability of transmission characteristics by relatively simple control.

The wireless electrical power supply apparatus includes a first DC voltage conversion portion configured to output the first input voltage and receive the second output voltage, and a second DC voltage conversion portion configured to receive the first output voltage and output the second input voltage, and can be configured such that the voltage control circuit controls the first voltage difference during the forward power transmission by controlling the first DC voltage conversion portion to change the first input voltage and also controls the second voltage difference during the reverse power transmission by controlling the second DC voltage conversion portion to change the second input voltage.

The wireless electrical power supply apparatus can be configured such that during the forward power transmission, the first electrical power supply unit and the second electrical power supply unit operate as forward converters, and the second electrical power supply unit performs a half-wave rectification operation.

The wireless electrical power supply apparatus includes a first DC voltage conversion portion configured to output the first input voltage during the forward power transmission and receive the second output voltage during the reverse power transmission, and can be configured such that the voltage control circuit controls the first voltage difference during the forward power transmission by controlling the first DC voltage conversion portion to change the first input voltage and also controls the second voltage difference during the reverse power transmission by controlling the first DC voltage conversion portion to change the second output voltage.

The wireless electrical power supply apparatus can be configured such that the voltage control circuit includes a first control circuit configured to control the first voltage difference and a second control circuit configured to control the second voltage difference, the second control circuit notifies the first control circuit of an output power value of the second electrical power supply unit, the output power value and an output voltage value of the second electrical power supply unit, or the output voltage value and an output current value of the second electrical power supply unit, during the forward power transmission, and the first control circuit notifies the second control circuit of an output power value of the first electrical power supply unit, the output power value and an output voltage value of the first electrical power supply unit, or the output voltage value and an output current value of the first electrical power supply unit, during the reverse power transmission.

The wireless electrical power supply apparatus can be configured such that the voltage control circuit controls an on-time of the first switching device within a tolerable cycle range during the forward power transmission and/or controls an on-time of the second switching device within a tolerable cycle range during the reverse power transmission.

The wireless electrical power supply apparatus can be configured such that when the first transmission coil and the second transmission coil are apart at a distance shorter than a prescribed distance, the voltage control circuit restricts power transmission between the first electrical power supply unit and the second electrical power supply unit.

In the wireless electrical power supply apparatus, the first electrical power supply unit may have a resonant circuit whose constant is different from a constant of a resonant circuit in the second electrical power supply unit.

The wireless electrical power supply apparatus can be configured such that the first electrical power supply unit includes a first changeover capacitor and a first changeover switch configured to be turned on to connect the first changeover capacitor in parallel or series to the first resonant capacitor and turned off to electrically disconnect the first changeover capacitor from the first resonant capacitor, and the second electrical power supply unit includes a second changeover capacitor and a second changeover switch configured to be turned on to connect the second changeover capacitor in parallel or series to the second resonant capacitor and turned off to electrically disconnect the second changeover capacitor from the second resonant capacitor.

A wireless electrical power supply apparatus according to another embodiment of the present invention includes: a first electrical power supply unit including a first transmission coil, a first switching device connected in series to the first transmission coil, and a first resonant capacitor connected in parallel to either the first transmission coil or the first switching device, or both; a second electrical power supply unit including a second transmission coil, a diode connected in series to the second transmission coil, and a second resonant capacitor connected in parallel to the second transmission coil; a first switching control circuit configured to control turn-off of the first switching device and also control turn-on of the first switching device in synchronization with a resonant voltage in the first electrical power supply unit such that the first switching device performs a zero-voltage switching operation; and a voltage control circuit configured to control a voltage difference between an input voltage to the first electrical power supply unit and an output voltage from the second electrical power supply unit during power transmission from the first electrical power supply unit to the second electrical power supply unit.

A wireless electrical power supply apparatus according to still another embodiment of the present invention includes: a first electrical power supply unit connected to a first DC power source; a second electrical power supply unit connected to a second DC power source; and a control portion configured to control the first electrical power supply unit and the second electrical power supply unit, wherein the first electrical power supply unit and the second electrical power supply unit transmit power to each other, the first electrical power supply unit includes a first transmission coil, a first switching device connected in series to the first transmission coil, and a first resonant capacitor connected in parallel to either the first transmission coil or the first switching device, or both, the second electrical power supply unit includes a second transmission coil, a second switching device connected in series to the second transmission coil, and a second resonant capacitor connected in parallel to either the second transmission coil or the second switching device, or both, and the control portion includes a first turn-on control circuit configured to control turn-on of the first switching device in synchronization with a resonant voltage induced by the first transmission coil and the first resonant capacitor such that the first switching device performs a zero-voltage switching operation, and a second turn-on control circuit configured to control turn-on of the second switching device in synchronization with a resonant voltage induced by the second transmission coil and the second resonant capacitor such that the second switching device performs a zero-voltage switching operation, and a cross-phase shift control circuit configured to perform control to cause a predetermined phase difference between switching of the first switching device and switching of the second switching device.

In this configuration, the first electrical power supply unit is a single-switch converter actuated by the first switching device, and the second electrical power supply unit is a single-switch converter actuated by the second switching device, whereby reductions in cost and size of the apparatus can be realized.

Furthermore, in this configuration, the first switching device and the second switching device perform a zero-voltage switching operation and are controlled to cause a predetermined phase difference between switching of the first switching device and switching of the second switching device, whereby the stability of transmission characteristics and the ability to control transmission power can be enhanced.

In the wireless electrical power supply apparatus, the cross-phase shift control circuit preferably performs control to cause the phase difference between turn-off of the first switching device and turn-off of the second switching device.

In the wireless electrical power supply apparatus, the phase difference is preferably 45 to 315 degrees.

The wireless electrical power supply apparatus can be configured such that the cross-phase shift control circuit includes a phase difference detector configured to directly or indirectly sense the phase difference, a phase difference instruction circuit configured to directly or indirectly indicate a target value for the phase difference, a feedback control portion configured to control the phase difference by feedback control comparing a detection value from the phase difference detector and the target value from the phase difference instruction circuit, and a conductive-time-variable portion configured to change a conductive time of the second switching device in accordance with an output from the feedback control portion.

The wireless electrical power supply apparatus can be configured such that the phase difference detector indirectly detects the phase difference by detecting transmission power, and the phase instruction circuit indirectly indicates the target value by indicating transmission power.

The wireless electrical power supply apparatus can be configured such that the cross-phase shift control circuit includes a sensing element configured to sense a change in voltage of the first transmission coil by contactless magnetic or electric field sensing.

The wireless electrical power supply apparatus can be configured such that the cross-phase shift control circuit includes a conductive time control circuit configured to control a conductive time of the first switching device to adjust an operating frequency of the first electrical power supply unit to a predetermined value.

The wireless electrical power supply apparatus can be configured such that the cross-phase shift control circuit controls the phase difference to adjust transmission power between the first transmission coil and the second transmission coil to a predetermined value.

The wireless electrical power supply apparatus can be configured such that the cross-phase shift control circuit includes a timing signal transmission circuit configured to transmit an optical or radio signal about switching timing of the first switching device, and a timing signal reception circuit configured to receive the optical or radio signal transmitted by the timing signal transmission circuit.

The wireless electrical power supply apparatus can be configured such that the second switching device includes a transistor and an anti-parallel diode connected in anti-parallel to the transistor, and the cross-phase shift control circuit includes a phase difference detector configured to directly or indirectly sense the phase difference, a phase difference instruction circuit configured to directly or indirectly indicate a target value for the phase difference, a feedback control portion configured to control the phase difference by feedback control comparing a detection value from the phase difference detector and the target value from the phase difference instruction circuit, a resonant current sensor configured to detect a zero cross point of a current flowing through the second transmission coil, and a conductive-time-variable portion configured to control an on-time of the transistor that follows turn-off of the anti-parallel diode, in accordance with a detection result from the resonant current sensor and an output from the feedback control portion.

Effect of the Invention

The present invention renders it possible to provide a wireless electrical power supply apparatus capable of enhancing the stability of transmission characteristics while realizing reductions in cost and size of the apparatus.

BRIEF DESCRIPTION OF THE DRAWINGS

FIG. 1 is a diagram illustrating a wireless electrical power supply apparatus according to a first embodiment.

FIG. 2 is a graph showing the relationship between an input voltage and transmission power of the wireless electrical power supply apparatus according to the first embodiment.

FIG. 3 is a timing chart describing a zero-voltage switching operation of a first switching device in the first embodiment.

FIG. 4 is a timing chart describing operation modes of the wireless electrical power supply apparatus according to the first embodiment.

FIG. 5 provides diagrams illustrating current paths in the operation modes of the wireless electrical power supply apparatus according to the first embodiment.

FIG. 6 is a diagram illustrating a wireless electrical power supply apparatus according to a second embodiment.

FIG. 7 is a graph showing the relationship between an input voltage and transmission power of the wireless electrical power supply apparatus according to the second embodiment.

FIG. 8 is a diagram illustrating a wireless electrical power supply apparatus according to a third embodiment.

FIG. 9 is a diagram illustrating a variant receiver-side configuration in the third embodiment.

FIG. 10 is a diagram illustrating a wireless electrical power supply apparatus according to a fourth embodiment.

FIG. 11 is a timing chart for components of the wireless electrical power supply apparatus according to the fourth embodiment.

FIG. 12 is a graph showing the relationship among phase difference, transmission power, and operating frequency for the wireless electrical power supply apparatus according to the fourth embodiment.

FIG. 13 is a diagram illustrating a wireless electrical power supply apparatus according to a fifth embodiment.

FIG. 14 is a diagram showing an operation principle of the wireless electrical power supply apparatus according to the fifth embodiment.

FIG. 15 is a diagram illustrating a wireless electrical power supply apparatus according to a sixth embodiment.

FIG. 16 is a timing chart for components of the wireless electrical power supply apparatus according to the sixth embodiment.

MODES FOR CARRYING OUT THE INVENTION

Hereinafter, embodiments of a wireless electrical power supply apparatus according to the present invention will be described with reference to the accompanying drawings.

First Embodiment

FIG. 1 illustrates a wireless electrical power supply apparatus 100 according to a first embodiment of the present invention. The wireless electrical power supply apparatus 100 is divided into primary and secondary sides; the primary side includes a first electrical power supply unit 101, a first filter circuit 102, a first DC voltage conversion portion 103, and a first control portion 110, and the secondary side includes a second electrical power supply unit 104, a second filter circuit 105, a second DC voltage conversion portion 106, and a second control portion 120.

The components of the primary side are provided in, for example, a residential building, and the components of the secondary side are provided in, for example, an electricity-powered vehicle such as an electric vehicle or a plug-in hybrid car. The wireless electrical power supply apparatus 100 performs bidirectional power transmission between the primary side and the secondary side. In the following, the power transmission from the primary side to the secondary side will be referred to as the forward power transmission, and the power transmission from the secondary side to the primary side will be referred to as the reverse power transmission.

The first electrical power supply unit 101 is a single-switch converter including a first switching device $SW_1$, a first transmission coil $L_1$, and a first resonant capacitor $C_1$. The first resonant capacitor $C_1$ is connected in parallel to either the first transmission coil $L_1$ or the first switching device $SW_1$, or both (in the present embodiment, the first transmission coil $L_1$). In the case where the wireless electrical power supply apparatus is used in an electric car, the wireless electrical power supply apparatus is required to operate within a specific frequency range around a nominal frequency of 85 kHz. Accordingly, the resonant frequency that is determined by the first transmission coil $L_1$ and the first resonant capacitor $C_1$ is suitably selected to be higher than the operating frequency. For example, in the case of several-kilowatt power transmission, the resonant frequency to be used ranges from 1.1 times to less than twice the operating frequency.

The first switching device $SW_1$ includes a first transistor $Q_1$ connected in series to the first transmission coil $L_1$, and a first diode $D_1$ connected in anti-parallel to the first transistor $Q_1$. The first transistor $Q_1$ is a power semiconductor device such as an IGBT (insulated-gate bipolar transistor), a MOSFET (metal-oxide-semiconductor field-effect transistor), a bipolar transistor, or a SiC (silicon carbide) semiconductor. The first diode $D_1$ is an internal (parasitic) diode of the first transistor $Q_1$ or a diode independent of the first transistor $Q_1$.

The first filter circuit 102 includes a first capacitor $C_3$ and a first coil $L_3$. The first capacitor $C_3$ is connected at one terminal to a high-potential terminal of the first DC voltage conversion portion 103 via the first coil $L_3$ and at the other terminal to a low-potential terminal of the first DC voltage conversion portion 103.

The first DC voltage conversion portion 103 is a bidirectional DC/DC converter. The first DC voltage conversion portion 103 is connected to a first power source $E_3$. The first power source $E_3$ is, for example, a bidirectional AC/DC converter. The first DC voltage conversion portion 103 performs a forward voltage conversion operation for raising or lowering an input DC voltage from the first power source $E_3$ and outputting the voltage to the first filter circuit 102, and also performs a reverse voltage conversion operation for lowering or raising an input DC voltage from the first filter circuit 102 and outputting the voltage to the first power source $E_3$.

The second electrical power supply unit 104 is a single-switch converter including a second switching device $SW_2$, a second transmission coil $L_2$, and a second resonant capacitor $C_2$. The second resonant capacitor $C_2$ is connected in parallel to either the second transmission coil $L_2$ or the second switching device $SW_2$, or both (in the present embodiment, the second transmission coil $L_2$). The resonant frequency that is determined by the second transmission coil $L_2$ and the second resonant capacitor $C_2$ is suitably selected to be higher than the operating frequency. For example, in the case of several-kilowatt power transmission, the resonant frequency to be used ranges from 1.1 times to less than twice the operating frequency.

The second switching device $SW_2$ includes a second transistor $Q_2$ connected in series to the second transmission coil $L_2$ and a second diode $D_2$ connected in anti-parallel to the second transistor $Q_2$. Similar to the first transistor $Q_1$, the second transistor $Q_2$ is a power semiconductor device such as an IGBT, a MOSFET, a bipolar transistor, or a SiC semiconductor. The second diode $D_2$ is an internal (parasitic) diode of the second transistor $Q_2$ or a diode independent of the second transistor $Q_2$.

The second filter circuit 105 includes a second capacitor $C_4$ and a second coil $L_4$. The second capacitor $C_4$ is connected at one terminal to a high-potential terminal of the second DC voltage conversion portion 106 via the second coil $L_4$ and at the other terminal to a low-potential terminal of the first DC voltage conversion portion 106.

The second DC voltage conversion portion 106 is a bidirectional DC/DC converter. The second DC voltage conversion portion 106 is connected to a second power source $E_4$. The second power source $E_4$ is, for example, a storage battery provided in an electricity-powered vehicle. The second DC voltage conversion portion 106 performs a forward voltage conversion operation for raising or lowering an input DC voltage from the second filter circuit 105 and outputting the voltage to the second power source $E_4$, and also performs a reverse voltage conversion operation for lowering or raising an input DC voltage from the second power source $E_4$ and outputting the voltage to the second filter circuit 105.

The first control portion 110 includes a first resonant voltage sensing circuit 111, a first synchronization circuit 112, and a first control circuit 113. Similarly, the second control portion 120 includes a second resonant voltage sensing circuit 121, a second synchronization circuit 122, and a second control circuit 123.

The first resonant voltage sensing circuit 111 and the first synchronization circuit 112 collectively correspond to the "first switching control circuit" of the present invention. The second resonant voltage sensing circuit 121 and the second synchronization circuit 122 collectively correspond to the "second switching control circuit" of the present invention. The first control circuit 113 and the second control circuit 123 correspond to the "voltage control circuits" of the present invention.

The first resonant voltage sensing circuit 111 measures an end-to-end voltage $V_{R1}$ of the first resonant capacitor $C_1$ during the forward power transmission, and thereby senses a zero cross point of a first resonant voltage induced by the first transmission coil $L_1$ and the first resonant capacitor $C_1$. After the sensing of the zero cross point, the first resonant voltage sensing circuit 111 outputs a zero cross signal to the first synchronization circuit 112.

The first synchronization circuit 112 turns on the first transistor $Q_1$ in synchronization with the first resonant voltage, on the basis of the zero cross signal, such that the first transistor $Q_1$ performs a zero-voltage switching operation. Moreover, the first synchronization circuit 112 turns off the first transistor $Q_1$ during the reverse power transmission in accordance with an instruction (control instruction) from the first control circuit 113 such that the first diode $D_1$ performs a rectification operation.

The first synchronization circuit 112 performs on/off control of the first transistor $Q_1$ during the forward power transmission, so that a current flows to the first transmission coil $L_1$ and the first resonant capacitor $C_1$. As a result, magnetic field resonance (equivalent in meaning to magnetic resonance or magnetic resonation) causes a current to flow to the second transmission coil $L_2$ and the second resonant capacitor $C_2$ at some distance. In this manner, the first electrical power supply unit 101 performs contactless power transmission to the second electrical power supply unit 104.

The second resonant voltage sensing circuit 121 measures an end-to-end voltage $V_{R2}$ of the second resonant capacitor $C_2$ during the reverse power transmission and thereby senses a zero cross point of a second resonant voltage induced by the second transmission coil $L_2$ and the second resonant capacitor $C_2$. After the sensing of the zero cross point, the second resonant voltage sensing circuit 121 outputs a zero cross signal to the second synchronization circuit 122.

The second synchronization circuit 122 turns on the second transistor $Q_2$ in synchronization with the second resonant voltage, on the basis of the zero cross signal, such that the second transistor $Q_2$ performs a zero-voltage switching operation. Moreover, the second synchronization circuit 122 turns off the second transistor $Q_2$ during the forward power transmission in accordance with an instruction (control instruction) from the second control circuit 123 such that the second diode $D_2$ performs a rectification operation.

The second synchronization circuit 122 performs on/off control of the second transistor $Q_2$ during the reverse power transmission, so that a current flows to the second transmission coil $L_2$ and the second resonant capacitor $C_2$. As a result, magnetic field resonance causes a current to flow to the first transmission coil $L_1$ and the first resonant capacitor $C_1$ at some distance. In this manner, the second electrical power supply unit 104 performs contactless power transmission to the first electrical power supply unit 101.

The first control circuit 113 performs first voltage difference control during the forward power transmission so as to control the difference (first voltage difference) between a first input voltage $E_1$ to the first electrical power supply unit 101 and a first output voltage $E_2$ from the second electrical power supply unit 104, thereby controlling output power that is to be provided by the second electrical power supply unit 104 (i.e., transmission power from the first electrical power supply unit 101 to the second electrical power supply unit 104).

More specifically, the first control circuit 113 starts the first voltage difference control in response to a first control instruction 114 provided from outside or a charge start notification included in an intercommunication signal 130 exchanged with the second control circuit 123. An example of the intercommunication signal 130 to be used is a Wi-Fi or Bluetooth® (registered trademark) short-range wireless communication signal. After the start of the first voltage difference control, the first control circuit 113 obtains values of the first input voltage $E_1$ and/or values of a first input current in predetermined cycles on the basis of first detection signals 115 from a first detection means $X_1$ (e.g., a current transformer). The first input current is a current flowing from the first DC voltage conversion portion 103 to the first filter circuit 102.

Furthermore, the first control circuit 113 obtains output power information in predetermined cycles from the intercommunication signal 130 exchanged with the second control circuit 123. The output power information indicates an output power value, the output power value and a value of the first output voltage $E_2$, or the value of the first output voltage $E_2$ and a value of a first output current. The first output current is a current flowing from the second filter circuit 105 to the second DC voltage conversion portion 106.

While obtaining necessary information as described above, the first control circuit 113 outputs a first control signal 116 to the first DC voltage conversion portion 103 with a view to controlling the first input voltage $E_1$ and hence the first voltage difference such that the output power value becomes equal to a predetermined target power value.

In a specific control method, when the output power information indicates only the output power value, the first control circuit 113 controls the first input voltage $E_1$ with reference to a pre-memorized lower limit of the first output voltage $E_2$, such that the first input voltage $E_1$ becomes higher than the lower limit, while setting the output power value to the predetermined target power value.

When the output power information indicates the value of the first output voltage $E_2$ and the output power value, the first control circuit 113 compares the first output voltage $E_2$ with the first input voltage $E_1$ and controls the first input voltage $E_1$ such that the first input voltage $E_1$ becomes higher than the first output voltage $E_2$, while setting the output power value to the predetermined target power value.

When the output power information indicates the value of the first output voltage $E_2$ and the value of the first output current, the first control circuit 113 compares the first output voltage $E_2$ with the first input voltage $E_1$ and controls the first input voltage $E_1$ such that the first input voltage $E_1$ becomes higher than the first output voltage $E_2$. Simultaneously, the first control circuit 113 calculates the output power value on the basis of the output power information, and controls the first input voltage $E_1$ such that the calculated power value becomes equal to the predetermined target power value.

It should be noted that when the value of the first output voltage $E_2$ is constant and the first control circuit 113 has memorized therein information (e.g., a relational expression) representing the relationship between the first input voltage $E_1$ and the output power, the first control circuit 113 can control the first input voltage $E_1$ without communicating with the second control circuit 123 at the start of and during power supply.

Furthermore, when the first control circuit 113 has memorized therein information representing the relationship between the first input voltage $E_1$ and the first voltage difference and the relationship between the first voltage difference and the output power, the first control circuit 113 can also control the first input voltage $E_1$ without communicating with the second control circuit 123. However, to allow the output power value to approach the target power value with more accuracy, the first control circuit 113 preferably obtains the output power information from the intercommunication signal 130 exchanged with the second control circuit 123.

The second control circuit 123 performs second voltage difference control during the reverse power transmission so as to control the difference (second voltage difference) between a second input voltage $E_2$ to the second electrical power supply unit 104 and a second output voltage $E_1$ from the first electrical power supply unit 101, thereby controlling output power that is to be provided by the first electrical power supply unit 101 (i.e., transmission power from the second electrical power supply unit 104 to the first electrical power supply unit 101).

More specifically, the second control circuit 123 starts the second voltage difference control in response to a second control instruction 124 provided from outside or a discharge start notification included in an intercommunication signal 130 exchanged with the first control circuit 113. After the start of the second voltage difference control, the second control circuit 123 obtains values of the second input voltage $E_2$ and/or values of a second input current in predetermined cycles on the basis of second detection signals 125 from a second detection means $X_2$ (e.g., a current transformer). The second input current is a current flowing from the second DC voltage conversion portion 106 to the second filter circuit 105.

Furthermore, the second control circuit 123 obtains output power information in predetermined cycles from the intercommunication signal 130 exchanged with the first control circuit 113. The output power information indicates an output power value, the output power value and a value of the second output voltage $E_1$, or the value of the second output voltage $E_1$ and a value of a second output current. The second output current is a current flowing from the first filter circuit 102 to the first DC voltage conversion portion 103.

While obtaining necessary information as described above, the second control circuit 123 outputs a second control signal 126 to the second DC voltage conversion portion 106 with a view to controlling the second input voltage $E_2$ and hence the second voltage difference such that the output power value becomes equal to a predetermined target power value. The specific method of control is the same as that used by the first control circuit 113 during the forward power transmission.

FIG. 2 shows the relationship between the first input voltage $E_1$ and transmission power P from the first electrical power supply unit 101 to the second electrical power supply unit 104 during the forward power transmission. In FIG. 2, the first output voltage $E_2$ is constant at 350V. The transmission power P can be calculated based on, for example, a second detection signal 125 from the second detection means $X_2$.

As can be appreciated from FIG. 2, when the first input voltage $E_1$ is changed by 110V from 350V to 460V, the transmission power P changes from 0 kW to 6 kW. In this manner, in the case of the wireless electrical power supply apparatus 100, the transmission power P can be controlled by controlling the first voltage difference between the first input voltage $E_1$ and the first output voltage $E_2$.

For example, even when there are variations in electrostatic capacitance among second resonant capacitors $C_2$, the transmission power P can be stably controlled from zero to a desired value by changing the first input voltage $E_1$. Note that in FIG. 2, the lower limit of the first input voltage $E_1$ is the same as the first output voltage $E_2$ but does not have to be the same.

Next, a zero-voltage switching operation of the first switching device $SW_1$ during the forward power transmission will be described with reference to FIG. 3. Note that the second switching device $SW_2$ also performs a zero-voltage switching operation during the reverse power transmission in a similar manner to that performed by the first switching device $SW_1$ during the forward power transmission.

FIG. 3 provides waveforms of: (A) an end-to-end voltage $V_{SW1}$ of the first switching device $SW_1$; (B) a current $I_{SW1}$ flowing through the first switching device $SW_1$; (C) an end-to-end voltage $V_{R1}$ of the first resonant capacitor $C_1$; (D) a drive gate voltage $V_{g1}$ of the first transistor $Q_1$; and (E) a drive gate voltage $V_{g2}$ of the second transistor $Q_2$. The first transistor $Q_1$ and the second transistor $Q_2$ are turned on when the drive gate voltages $V_{g1}$ and $V_{g2}$ are high and turned off when the drive gate voltages $V_{g1}$ and $V_{g2}$ are low.

During the period $T_{OFF}$ in which the first switching device $SW_1$ is off, the first resonant capacitor $C_1$ has a first resonant voltage, which is induced by the first transmission coil $L_1$ and the first resonant capacitor $C_1$, applied to both terminals thereof.

Once the first resonant voltage sensing circuit 111 detects a zero cross point $t_z$ where the end-to-end voltage $V_{R1}$ of the first resonant capacitor $C_1$ crosses zero, the first synchronization circuit 112 turns on the first transistor $Q_1$ at time $t_{zg}$, synchronous to the zero cross point $t_z$, by switching the drive gate voltage $V_{g1}$ of the first transistor $Q_1$ from low to high.

Here, depending on the state of a load (e.g., the first power source $E_3$), the end-to-end voltage $V_{SW1}$ of the first switching device $SW_1$ might be reduced in amplitude and hence might not reach zero. On the other hand, the end-to-end voltage $V_{R1}$ of the first resonant capacitor $C_1$ crosses zero regardless of the size of amplitude. Accordingly, in the present embodiment, the first resonant voltage sensing circuit 111 is configured to detect the zero cross point $t_z$ of the end-to-end voltage $V_{R1}$ of the first resonant capacitor $C_1$.

Furthermore, to realize the zero-voltage switching operation of the first switching device $SW_1$, the first transistor $Q_1$ may be turned on at time $t_0$. However, time $t_0$ might be shifted depending on the state of a load (e.g., the first power source $E_3$). Accordingly, in the present embodiment, the first transistor $Q_1$ is turned on at time $t_{zg}$ later than time $t_0$ in order to allow a slight leeway.

Next, operation modes (Mode-1, Mode-2, Mode-3, and Mode-4) of the wireless electrical power supply apparatus 100 during the forward power transmission will be described with reference to FIGS. 4 and 5.

FIG. 4 provides waveforms of: (A) the end-to-end voltage $V_{SW1}$ of the first switching device $SW_1$; (B) the current $I_{SW1}$ flowing through the first switching device $SW_1$; (C) a current $I_{L1}$ flowing through the first transmission coil $L_1$; (D) a current $I_{L2}$ flowing through the second transmission coil $L_2$; (E) an end-to-end voltage $V_{SW2}$ of the second switching device $SW_2$; and (F) a current $I_{SW2}$ flowing through the second switching device $SW_2$.

FIG. 5 provides diagrams schematically illustrating currents flowing in the first electrical power supply unit 101 and the second electrical power supply unit 104 during Mode-1, Mode-2, Mode-3, and Mode-4 periods respectively spanning from time $t_0$ to time $t_1$, from time $t_1$ to time $t_2$, from time $t_2$ to time $t_3$, and from time $t_3$ to time $t_4$ ($=t_0$), as shown in FIG. 4.

It should be noted that in FIG. 5, the first electrical power supply unit 101 includes the first capacitor $C_3$, and the second electrical power supply unit 104 includes the second capacitor $C_4$. Moreover, in FIG. 5, the currents flowing through the first transmission coil $L_1$ and the second transmission coil $L_2$ are indicated by double-headed arrows as being changeable between positive and negative, as shown in FIG. 4.

Once the end-to-end voltage $V_{SW1}$ of the first switching device $SW_1$ reaches zero at time $t_0$ ($=t_4$), the Mode-1 period starts. During the Mode-1 period, the first switching device $SW_1$ is turned on by the first diode $D_1$ thereof automatically becoming conductive. Thereafter, the first transistor $Q_1$ is turned on by a zero-voltage switching operation.

During the period (from the Mode-1 period to the Mode-2 period) in which the first switching device $SW_1$ is kept on, the first input voltage $E_1$ is being applied to the first transmission coil $L_1$, and therefore the currents $I_{SW1}$ and $I_{L1}$ gently change from negative to positive. Once the current $I_{SW1}$ changes from negative to positive, the current flowing through the first diode $D_1$ smoothly flows through the first transistor $Q_1$, with the result that the first switching device $SW_1$ continues to be on. Note that in the case where the first transistor $Q_1$ has a lower on-resistance than the first diode $D_1$, the current $I_{SW1}$ flows through the first transistor $Q_1$ after the first transistor $Q_1$ is turned on.

During the Mode-1 period, the end-to-end voltage $V_{SW2}$ of the second switching device $SW_2$ gently rises and falls to zero along a resonance curve. During the Mode-1 period, no current $I_{SW2}$ flows due to the second switching device $SW_2$ being off, and the current $I_{L2}$ gently changes from positive to negative and reaches a negative peak.

Once the end-to-end voltage $V_{SW2}$ of the second switching device $SW_2$ reaches zero at time $t_1$, the Mode-2 period starts. During the Mode-2 period, the second switching device $SW_2$ is turned on by the second diode $D_2$ thereof automatically becoming conductive. During the period (from the Mode-2 period to the Mode-3 period) in which the second switching device $SW_2$ is kept on, the second input voltage $E_2$ is being applied to the second transmission coil $L_2$, and therefore the currents $I_{SW2}$ and $I_{L2}$ change from negative toward zero.

The drive gate voltage $V_{g1}$ of the first switching device $SW_1$ changes from high to low at time $t_2$ after a lapse of a predetermined time period (e.g., a time period preset by the first synchronization circuit 112 such that the first resonant voltage has a zero cross cycle that falls within a predetermined range), with the result that the first transistor $Q_1$ is turned off, and the Mode-3 period starts.

During the Mode-3 period, the first switching device $SW_1$ is turned off, so that the current that is stored on the first transmission coil $L_1$ flows into the first resonant capacitor $C_1$, thereby rendering the first electrical power supply unit 101 in a resonant state. The end-to-end voltage $V_{SW1}$ of the first switching device $SW_1$ gently rises along a resonance curve. The current $I_{L1}$ flowing through the first transmission coil $L_1$ is a resonant current and gently decreases after reaching a positive peak.

During the Mode-3 period, the currents $I_{SW2}$ and $I_{L2}$ change from negative toward zero. Once the current $I_{SW2}$ becomes zero at time $t_3$, i.e., the current flowing through the second diode $D_2$ stops flowing, the Mode-3 period ends, and the Mode-4 period starts.

During the Mode-4 period, the second switching device $SW_2$ (the second diode $D_2$) is turned off, so that the current that is stored on the second transmission coil $L_2$ flows into the second resonant capacitor $C_2$, thereby rendering the second electrical power supply unit 104 in a resonant state. The end-to-end voltage $V_{SW2}$ of the second switching device $SW_2$ gently rises along a resonance curve. Since the second switching device $SW_2$ is off, no current $I_{SW2}$ flows, but the current $I_{L2}$ gently rises and thereafter gently falls.

During the Mode-4 period, the current $I_{L1}$ gently changes from positive to negative. The end-to-end voltage $V_{SW1}$ of the first switching device $SW_1$ gently rises and falls along a resonance curve. Once the end-to-end voltage $V_{SW1}$ of the first switching device $SW_1$ reaches zero at time $t_4$, the Mode-4 period ends.

The current $I_{L2}$ flowing through the second transmission coil $L_2$ has a phase difference $T\phi$ from the current $I_{L1}$ flowing through the first transmission coil $L_1$, corresponding to the first voltage difference between the first input voltage $E_1$ and the first output voltage $E_2$, as shown in FIG. 4. Accordingly, the wireless electrical power supply apparatus 100 can provide desired transmission power by controlling the first voltage difference to cause a phase difference between the current $I_{SW1}$ flowing through the first switching device $SW_1$ and the current $I_{SW2}$ flowing through the second switching device $SW_2$.

It can be appreciated from the foregoing that during the forward power transmission, the first electrical power supply unit 101 on the power transmission side and the second electrical power supply unit 104 on the power reception side operate as forward converters, and that the second electrical power supply unit 104 performs a half-wave rectification operation. It is advantageous that even when the second electrical power supply unit 104 (i.e., the receiver-side electrical power supply unit) performs a half-wave rectification operation with a simple configuration, it is still possible to transmit power greater than or equal to the power that can be transmitted by a normal wireless electrical power supply apparatus performing a full-wave rectification operation. The reason for this is as follows. Specifically, in the case of the full-wave rectification operation, a resonant voltage in a parallel resonant circuit consisting of the second transmission coil $L_2$ and the second resonant capacitor $C_2$ is clamped at the level of the first output voltage $E_2$ by a rectification element (diode) being rendered conductive regardless of a positive or negative half wave, resulting in an insignificant resonance effect and hence no increase in transmission power from the first electrical power supply unit 101. On the other hand, in the case of the half-wave rectification operation, some resonance effect can be achieved during a half-wave period, in which the rectification element (i.e., the second diode $D_2$) is not conductive, resulting in an increase in transmission power from the first electrical power supply unit 101.

While the foregoing has been provided taking as examples the operations during the forward power transmission, the same applies to operations during the reverse power transmission. Specifically, the wireless electrical power supply apparatus 100 can provide desired transmission power by controlling the second voltage difference to cause a phase difference between the currents $I_{SW1}$ and $I_{SW2}$. Moreover, during the reverse power transmission, the first electrical power supply unit 101 on the power reception side and the second electrical power supply unit 104 on the power transmission side operate as forward converters, and the first electrical power supply unit 101 performs a half-wave rectification operation.

In the wireless electrical power supply apparatus 100 according to the present embodiment, the first electrical power supply unit 101 is a single-switch converter actuated by the first switching device $SW_1$, and the second electrical power supply unit 104 is a single-switch converter actuated by the second switching device $SW_2$. In the case of an electric car, the power semiconductor device that is used as the first switching device $SW_1$ is relatively expensive because of requirements for high-speed switching performance of about 90 kHz and low loss and high withstand voltage characteristics. Moreover, the power semiconductor device is normally required to have cooling fins, and therefore providing a plurality of power semiconductor devices requires some space for accommodating the power semiconductor devices. Further, the lower the number of switching devices to be controlled is, the more readily the circuit that controls the timing of switching the switching devices can perform such control; in the case where the wireless electrical power supply apparatus is of a bridge converter type using a plurality of power semiconductors, accurate dead-time control is required for avoiding a malfunction due to two serially connected switching devices in an arm being turned on at the same time. On the other hand, when compared to such a wireless electrical power supply apparatus of a bridge converter type, the wireless electrical power supply apparatus 100 according to the present embodiment can be reduced in cost and size.

The wireless electrical power supply apparatus 100 according to the present embodiment employs a parallel resonant circuit configuration and therefore renders it possible to eliminate the need for specialized operations at the start of and during power supply and thereby perform transmission power control simply by controlling the difference between input and output voltages.

The wireless electrical power supply apparatus 100 according to the present embodiment can compensate for changes in transmission power due to variations of circuit constants by controlling the difference between input and output voltages. Specifically, the wireless electrical power supply apparatus 100 according to the present embodiment controls the difference between input and output voltages and thereby compensate for a difference in transmission power phase, which is a major cause of changes in transmission power. Thus, the wireless electrical power supply apparatus 100 according to the present embodiment can enhance the stability of transmission characteristics by relatively simple control.

Furthermore, the wireless electrical power supply apparatus 100 according to the present embodiment can compensate for a phase difference in transmission power by controlling the difference between input and output voltages, as described above, and therefore can allow both the primary and secondary sides to eliminate the need for means of detecting a phase on the transmitter side and communicating the detection to the receiver side and circuits configured to perform cross-phase shift control (the control resulting in a predetermined phase difference between switching of the first switching device $SW_1$ and switching of the second switching device $SW_2$) on the receiver side. This results in a simplified apparatus configuration and eliminates the need for high-speed communication about phase information.

For example, the intercommunication signal 130 includes no phase information and therefore can be a lower speed signal than signals for high-speed communication about phase information. Thus, the wireless electrical power supply apparatus 100 according to the present embodiment renders it possible to eliminate the need for high-speed communication about phase information and thereby enhance interconnectivity.

Second Embodiment

FIG. 6 illustrates a wireless electrical power supply apparatus 200 according to a second embodiment of the present invention. The wireless electrical power supply apparatus 200 has the same components as those in the first embodiment, except a first electrical power supply unit 201, a first control circuit 213 of a first control portion 210, a second electrical power supply unit 204, and a second control circuit 223 of a second control portion 220.

The first electrical power supply unit 201 is realized by additionally providing the first electrical power supply unit 101 in the first embodiment with a series circuit consisting of a first changeover capacitor $C_1'$ and a first changeover switch $S_1$. The series circuit is connected in parallel to the first resonant capacitor $C_1$. The first changeover switch $S_1$ is, for example, a semiconductor switch or relay.

The first changeover switch $S_1$ toggles between on and off under control of the first control circuit 213. When the first changeover switch $S_1$ is on, the first changeover capacitor $C_1'$ is connected in parallel to the first resonant capacitor $C_1$, and when the first changeover switch $S_1$ is off, the first changeover capacitor $C_1'$ is electrically disconnected from the first resonant capacitor $C_1$.

The first control circuit 213 is realized by additionally providing the first control circuit 113 in the first embodiment with the function of causing the first changeover switch $S_1$ to toggle between on and off. The first control circuit 213 includes, for example, a driver circuit for the first changeover switch $S_1$.

The second electrical power supply unit 204 is obtained by additionally providing the second electrical power supply unit 104 in the first embodiment with a series circuit consisting of a second changeover capacitor $C_2'$ and a second changeover switch $S_2$. The series circuit is connected in parallel to the second resonant capacitor $C_2$. The second changeover switch $S_2$ is, for example, a semiconductor switch or relay.

The second changeover switch $S_2$ toggles between on and off under control of the second control circuit 223. When the second changeover switch $S_2$ is on, the second changeover capacitor $C_2'$ is connected in parallel to the second resonant capacitor $C_2$, and when the second changeover switch $S_2$ is off, the second changeover capacitor $C_2'$ is electrically disconnected from the second resonant capacitor $C_2$.

The second control circuit 223 is obtained by additionally providing the second control circuit 123 in the first embodiment with the function of causing the second changeover switch $S_2$ to toggle between on and off. The second control circuit 223 includes, for example, a driver circuit for the second changeover switch $S_2$.

In the case of the forward power transmission, the first control circuit 213 turns off the first changeover switch $S_1$ in response to a first control instruction 114, or a charge start notification included in an intercommunication signal 130. On the other hand, the second control circuit 223 turns on the second changeover switch $S_2$ in response to the charge start notification included in the intercommunication signal 130, or a second control instruction 124. Specifically, the resonant frequency is set higher on the power transmission side than on the power reception side. This changes constants of a resonant circuit in the second electrical power supply unit 204. After the turn-off of the first changeover switch $S_1$ and the turn-on of the second changeover switch $S_2$, the first control circuit 213 starts first voltage difference control.

In the case of the reverse power transmission, the second control circuit 223 turns off the second changeover switch $S_2$ in response to a second control instruction 124, or a discharge start notification included in an intercommunication signal 130. On the other hand, the first control circuit 213 turns on the first changeover switch $S_1$ in response to the discharge start notification included in the intercommunication signal 130, or a first control instruction 114. Specifically, the resonant frequency is set higher on the transmitter side than on the receiver side. This changes constants of a resonant circuit in the first electrical power supply unit 201. After the turn-on of the first changeover switch $S_1$ and the turn-off of the second changeover switch $S_2$, the second control circuit 223 starts second voltage difference control.

FIG. 7 shows the relationship between the first input voltage $E_1$ and transmission power P from the first electrical power supply unit 201 to the second electrical power supply unit 204 during the forward power transmission. For the sake of comparison, FIG. 7 also shows the relationship between the first input voltage $E_1$ and the transmission power P in the first embodiment shown in FIG. 2. As in the first embodiment, the first output voltage $E_2$ is constant at 350V.

In FIG. 7, the electrostatic capacitance ratio between the first resonant capacitor $C_1$ and the second resonant capacitor $C_2$ is 1:1, and the electrostatic capacitance ratio between the second resonant capacitor $C_2$ and the second changeover capacitor $C_2'$ is 5:1. For example, the resonant capacitor of the first electrical power supply unit 201 has an electrostatic capacitance of 0.15 µF, and the resonant capacitor of the second electrical power supply unit 204 has an electrostatic capacitance of 0.18 µF. Note that in the first embodiment, the electrostatic capacitance of the resonant capacitor is 0.15 µF for both the first electrical power supply unit 101 and the second electrical power supply unit 104.

As can be appreciated from FIG. 7, in the second embodiment, when the first input voltage $E_1$ is changed by 70V from 310V to 380V, the transmission power P changes from 0 kW to 6 kW. Therefore, the wireless electrical power supply apparatus 200 according to the second embodiment can control the output power (transmission power P) using a smaller voltage difference than in the first embodiment. Moreover, the wireless electrical power supply apparatus 200 can set the voltage (first input voltage $E_1$) required for obtaining desired output power lower than in the first embodiment.

In a variant, in addition to or in place of the series circuit consisting of the first changeover capacitor $C_1'$ and the first changeover switch $S_1$, the first electrical power supply unit 201 may include a parallel circuit consisting of a third changeover capacitor and a third changeover switch. The parallel circuit is connected in series to the first resonant capacitor $C_1$. The third changeover switch, under control of the first control circuit 213, is turned off during the forward power transmission and turned on during the reverse power transmission.

In addition to or in place of the series circuit consisting of the second changeover capacitor $C_2'$ and the second changeover switch $S_2$, the second electrical power supply unit 204 may include a parallel circuit consisting of a fourth changeover capacitor and a fourth changeover switch. The parallel circuit is connected in series to the second resonant capacitor $C_2$. The fourth changeover switch, under control of the second control circuit 223, is turned on during the forward power transmission and turned off during the reverse power transmission.

Furthermore, the changeover capacitor can have a higher electrostatic capacitance than the first resonant capacitor $C_1$ or the second resonant capacitor $C_2$. For example, the electrostatic capacitance ratio between the first resonant capacitor $C_1$ and the second resonant capacitor $C_2$ can be set to 1:1, the electrostatic capacitance ratio between the first resonant capacitor $C_1$ and the first changeover capacitor $C_1'$ can be set to 1:5, and the electrostatic capacitance ratio between the second resonant capacitor $C_2$ and the second changeover capacitor $C_2'$ can be set to 1:5. When the first resonant capacitor $C_1$ and the second resonant capacitor $C_2$ have an electrostatic capacitance of 0.18 µF, the first changeover capacitor $C_1'$ and the second changeover capacitor $C_2'$ have an electrostatic capacitance of 0.9 µF.

Therefore, in the wireless electrical power supply apparatus 200 according to the present embodiment, the resonant capacitor on the receiver side is increased in electrostatic capacitance relative to the resonant capacitor on the transmitter side, thereby making the constants of the resonant circuit different between the transmitter side and the receiver side, with the result that output power can be controlled using a smaller voltage difference than in the first embodiment. Note that in the present embodiment, the resonant coils have the same constant, and the changeover capacitors cause the resonant capacitors to have different constants, but the resonant capacitors may have the same constant, and the resonant coils may have different constants.

Third Embodiment

FIG. 8 illustrates a wireless electrical power supply apparatus 300 according to a third embodiment of the present invention. The wireless electrical power supply apparatus 300 performs power transmission only from the primary side to the secondary side (forward power transmission) but not from the secondary side to the primary side (reverse power transmission).

The wireless electrical power supply apparatus 300 has the same components as those in the first embodiment, except a first DC voltage conversion portion 303, a second electrical power supply unit 304, a second DC voltage conversion portion 306, and a second control portion 320.

The first DC voltage conversion portion 303 is a unidirectional DC/DC converter. The first DC voltage conversion portion 303 simply performs a unidirectional voltage conversion operation for increasing or decreasing an input DC voltage to the first power source $E_3$ and outputting the DC voltage to the first filter circuit 102.

The second electrical power supply unit 304 includes a second transmission coil $L_2$, a second resonant capacitor $C_2$, and a third diode $D_3$. The second resonant capacitor $C_2$ is connected at a first terminal to a first terminal of the second transmission coil $L_2$ and at a second terminal to a second terminal of the second transmission coil $L_2$. The third diode $D_3$ is connected at an anode to a low-potential terminal of the second filter circuit 105 and at a cathode to the second terminal of the second resonant capacitor $C_2$. That is, the second electrical power supply unit 304 includes the third diode $D_3$ in place of the first switching device $SW_1$ in the first embodiment.

The second DC voltage conversion portion 306 is a unidirectional DC/DC converter. The second DC voltage conversion portion 306 simply performs a unidirectional voltage conversion operation for increasing or decreasing an input DC voltage to the second filter circuit 105 and outputting the DC voltage to the second power source $E_4$.

The second control portion 320 includes a second control circuit 323 but does not include the second resonant voltage sensing circuit 121 and the second synchronization circuit 122 as included in the first embodiment. The second control circuit 323 outputs a second control signal 326 to control the second DC voltage conversion portion 306. This is not intended to control the difference between input and output voltages as is done in the first and second embodiments, but to control power reception to supply desired power to the second power source $E_4$. The second DC voltage conversion portion 306 can be omitted unless the input voltage $E_2$ is required to be converted to an input voltage to the second power source $E_4$.

The second electrical power supply unit 304 and the second filter circuit 105 in the present embodiment can be replaced with a second electrical power supply unit 304' and a second filter circuit 105' as shown in FIG. 9. Specifically, the third diode $D_3$ may be connected at the anode to the first terminal of the second resonant capacitor $C_2$ and at the cathode to a high-potential terminal of the second filter circuit 105'. In such a case, the second filter circuit 105' may be additionally provided with a freewheeling diode for a choke coil. Moreover, the second capacitor $C_4$ may be provided in the subsequent stage to the second coil $L_4$. In FIG. 9, the second DC voltage conversion portion 306 is omitted.

Fourth Embodiment

FIG. 10 illustrates a wireless electrical power supply apparatus 400 according to a fourth embodiment of the present invention. The wireless electrical power supply apparatus 400 includes a first electrical power supply unit 401 connected to a first DC power source 402, a second electrical power supply unit 404 connected to a second DC power source 403, and a control portion 430, and the first DC power source 402 and the second DC power source 403 exchange power therebetween.

The first DC power source 402 includes a first battery $E_1$, and a first capacitor $C_3$ and a first coil $L_3$, which collectively correspond to the first filter circuit 102. The first battery $E_1$ is, for example, a storage battery provided in a home. Moreover, the first battery $E_1$ may be a combination of the first DC voltage conversion portion 103 and the first power source $E_3$ in the first embodiment. The first capacitor $C_3$ is connected at a first terminal to a high-potential terminal of the first battery $E_1$ via the first coil $L_3$ and at a second terminal to a low-potential terminal of the first battery $E_1$.

The second DC power source 403 includes a second battery $E_2$, and a second capacitor $C_4$ and a second coil $L_4$, which collectively correspond to the second filter circuit 105. The second battery $E_2$ is, for example, a storage battery provided in an electricity-powered vehicle. Moreover, the second battery $E_2$ may be a combination of the second DC voltage conversion portion 106 and the second power source $E_4$ in the first embodiment. The second capacitor $C_4$ is connected at a first terminal to a high-potential terminal of the second battery $E_2$ via the second coil $L_4$ and at a second terminal to a low-potential terminal of the second battery $E_2$.

The first electrical power supply unit 401 is a single-switch converter including a first transmission coil $L_1$, a first switching device $SW_1$, which is an IGBT, and a first resonant capacitor $C_1$. That is, the first electrical power supply unit 401 has the same configuration as the first electrical power supply unit 101 in the first embodiment. The first transmission coil $L_1$ is connected at a first terminal to the high-potential terminal of the first battery $E_1$ via the first coil $L_3$ and at a second terminal to the low-potential terminal of the first battery $E_1$ via a current path for the first switching device $SW_1$. The first resonant capacitor $C_1$ is connected in parallel to either the first transmission coil $L_1$ or the first switching device $SW_1$, or both (in the present embodiment, the first transmission coil $L_1$).

The second electrical power supply unit 404 is a single-switch converter including a second transmission coil $L_2$, a second switching device $SW_2$, which is an IGBT, and a second resonant capacitor $C_2$. That is, the second electrical power supply unit 404 has the same configuration as the second electrical power supply unit 104 in the first embodiment. The second transmission coil $L_2$ is connected at a first terminal to the high-potential terminal of the second battery $E_2$ via the second coil $L_4$ and at a second terminal to the low-potential terminal of the second battery $E_2$ via a current path for the second switching device $SW_2$. The second resonant capacitor $C_2$ is connected in parallel to either the second transmission coil $L_2$ or the second switching device $SW_2$, or both (in the present embodiment, the second transmission coil $L_2$).

The first transmission coil $L_1$ and the second transmission coil $L_2$ are magnetically coupled with a coupling coefficient of 0.5 or less. Moreover, in the present embodiment, the first switching device $SW_1$ and the second switching device $SW_2$ are IGBTs but may be auto turn-off switching devices such as MOSFETs or bipolar transistors.

The control portion 430 includes a first turn-on control circuit (431, 432), a second turn-on control circuit (433, 434), and a cross-phase shift control circuit (435 to 439).

The first turn-on control circuit includes a first resonant voltage sensing circuit 431 and a first synchronization circuit 432. The first resonant voltage sensing circuit 431 is configured to measure an end-to-end voltage $V_{R1}$ of the first transmission coil $L_1$ (or the first resonant capacitor $C_1$) and thereby detect a first resonant voltage induced by the first transmission coil $L_1$ and the first resonant capacitor $C_1$. The first synchronization circuit 432 is configured to control turn-on of the first switching device $SW_1$ in synchronization with the first resonant voltage, such that the first switching device $SW_1$ performs a zero-voltage switching operation.

The second turn-on control circuit includes a second resonant voltage sensing circuit 433 and a second synchronization circuit 434. The second resonant voltage sensing circuit 433 is configured to measure an end-to-end voltage $V_{R2}$ of the second transmission coil $L_2$ (or the second resonant capacitor $C_2$) and thereby detect a second resonant voltage induced by the second transmission coil $L_2$ and the second resonant capacitor $C_2$. The second synchronization circuit 434 is configured to control turn-on of the second switching device $SW_2$ in synchronization with the second resonant voltage, such that the second switching device $SW_2$ performs a zero-voltage switching operation.

The cross-phase shift control circuit includes a timing signal transmission circuit 435, a timing signal reception circuit 436, a sensing circuit 437, a comparison circuit 438, a turn-off phase difference control circuit 439.

The timing signal transmission circuit 435 is configured to transmit a timing signal for switching the first switching device $SW_1$, either optically or via radio. The timing signal reception circuit 436 is configured to receive the timing signal transmitted by the timing signal transmission circuit. In the present embodiment, the timing signal transmission circuit 435 includes a light-emitting diode, and the timing signal reception circuit 436 includes a phototransistor.

The sensing circuit 437 is configured to detect a current flowing between the second electrical power supply unit 404 and the second DC power source 403 and output a signal (e.g., a voltage signal) to the comparison circuit 438 in accordance with the detection result.

The comparison circuit 438 is configured to output a phase difference control instruction value such that transmission power between the first transmission coil $L_1$ and the second transmission coil $L_2$ is set to a predetermined target value. The comparison circuit 438 includes, for example, a differential amplifier whose inverting input terminal receives a reference voltage $V_{ref}$ in accordance with a target transmission power value and whose non-inverting input terminal receives a signal from the sensing circuit 437. In accordance with the difference between the two, the comparison circuit 438 outputs a signal to the turn-off phase difference control circuit 439 as a phase difference control instruction value.

The turn-off phase difference control circuit 439 outputs a control signal (for phase shift control) to the second synchronization circuit 434 on the basis of outputs from the timing signal reception circuit 436 and the comparison circuit 438, so as to cause a predetermined phase difference between turn-off of the first switching device $SW_1$ and turn-off of the second switching device $SW_2$. The second synchronization circuit 434 turns off the second switching device $SW_2$ in accordance with the control signal.

Next, control by the wireless electrical power supply apparatus 400 will be described with reference to FIG. 11. FIG. 11 provides waveforms of: (A) an end-to-end voltage $V_{SW1}$ of the first switching device $SW_1$; (B) a current $I_{SW1}$ flowing through the first switching device $SW_1$; (C) an end-to-end voltage $V_{R1}$ of the first transmission coil $L_1$; (D) a gate voltage $V_{g1}$ of the first switching device $SW_1$; (E) a gate voltage $V_{g2}$ of the second switching device $SW_2$; (F) an end-to-end voltage $V_{R2}$ of the second transmission coil $L_2$; (G) a current $I_{SW2}$ flowing through the second switching device $SW_2$; and (H) an end-to-end voltage $V_{SW2}$ of the second switching device $SW_2$.

During the period $T_{OFF1}$ in which the first switching device $SW_1$ is OFF, the end-to-end voltage $V_{R1}$ of the first transmission coil $L_1$ occurs resulting from a first resonant voltage being induced by the first transmission coil $L_1$ and the first resonant capacitor $C_1$.

The end-to-end voltage $V_{SW1}$ of the first switching device $SW_1$ gently rises and falls to zero along a resonance curve. Once the voltage $V_{SW1}$ reaches zero at time $t_1$, a first anti-parallel diode $D_1$ included in the first switching device $SW_1$ automatically becomes conductive, with the result that the first switching device $SW_1$ is rendered conductive.

Once the first resonant voltage sensing circuit 431 detects a zero cross point $t_0$ where the voltage $V_{R1}$ crosses zero, the first synchronization circuit 432 connected to the first resonant voltage sensing circuit 431 changes the gate voltage $V_{g1}$ of the first switching device $SW_1$ from low to high and thereby renders the first transistor $Q_1$ included in the first switching device $SW_1$ conductive at time $t_2$ in synchronization with the zero cross point $t_0$ of the first resonant voltage. That is, the first synchronization circuit 432 turns on the first switching device $SW_1$ so that the first switching device $SW_1$ performs a zero-voltage switching operation.

Here, the end-to-end voltage $V_{SW1}$ of the first switching device $SW_1$ might have a small amplitude and hence might not reach zero depending on the state of a load (e.g., the first DC power source 402), but the waveform of the end-to-end voltage $V_{R1}$ of the first transmission coil $L_1$ crosses zero regardless of the size of the amplitude. Accordingly, in the present embodiment, the first resonant voltage sensing circuit 431 is configured to detect the zero cross point $t_0$.

Furthermore, to achieve the zero-voltage switching operation of the first switching device $SW_1$, the first switching device $SW_1$ may be turned on at time $t_1$, but the timing of the turn-on might deviate from time $t_1$ depending on the load. Accordingly, in the present embodiment, the first switching device $SW_1$ is turned on at time $t_2$ later than time $t_1$ in order to allow a slight leeway.

During the period $T_{ON1}$ in which the first switching device $SW_1$ is conductive, a DC voltage of the first battery $E_1$ is applied to the first transmission coil $L_1$, and therefore the current $I_{SW1}$ flowing through the first switching device $SW_1$ is linearly increased. Once the current $I_{SW1}$ changes from negative to positive, the current flowing through the first anti-parallel diode $D_1$ smoothly flows through the first transistor $Q_1$, with the result that the first switching device $SW_1$ continues to be conductive.

The first synchronization circuit 432 changes the gate voltage $V_{g1}$ of the switching device $SW_1$ from high to low at time $t_6$ after a lapse of the preset period $T_{ON1}$, thereby shutting off the first transistor $Q_1$. As a result, the first switching device $SW_1$ is turned off, the current that is stored on the first transmission coil $L_1$ flows into the first resonant capacitor $C_1$, which causes a resonance state and continue to oscillate.

During the period $T_{OFF2}$ in which the second switching device $SW_2$ is OFF, the end-to-end voltage $V_{R2}$ of the second transmission coil $L_2$ occurs resulting from a second resonant voltage being induced by the second transmission coil $L_2$ and the second resonant capacitor $C_2$.

The end-to-end voltage $V_{SW2}$ of the second switching device $SW_2$ gently rises and falls to zero along a resonance curve. Once the voltage $V_{SW2}$ reaches zero at time $t_4$, a second anti-parallel diode $D_2$ included in the second switching device $SW_2$ automatically becomes conductive, with the result that the second switching device $SW_2$ is rendered conductive.

Once the second resonant voltage sensing circuit 433 detects a zero cross point $t_3$ where the voltage $V_{R2}$ crosses zero, the second synchronization circuit 434 connected to the second resonant voltage sensing circuit 433 changes the gate voltage $V_{g2}$ of the second switching device $SW_2$ from low to high and thereby renders the second transistor $Q_2$ included in the second switching device $SW_2$ conductive at time $t_5$ in synchronization with the zero cross point $t_3$ of the second resonant voltage. That is, the second synchronization circuit 434 turns on the second switching device $SW_2$ so that the second switching device $SW_2$ performs a zero-voltage switching operation.

During the period $T_{ON2}$ in which the second switching device $SW_2$ is conductive, a DC voltage of the second battery $E_2$ is applied to the second transmission coil $L_2$, and therefore the current $I_{SW2}$ flowing through the second switching device $SW_2$ is linearly increased. Once the current $I_{SW2}$ changes from negative to positive, the current flowing through the second anti-parallel diode $D_2$ smoothly flows through the second transistor $Q_2$, with the result that the second switching device $SW_2$ continues to be conductive.

Once the gate voltage $V_{g1}$ of the first switching device $SW_1$ transitions from high to low at time $t_6$, the first switching device $SW_1$ is turned off, and the timing signal transmission circuit 435 sends a timing signal to the timing signal reception circuit 436.

The turn-off phase difference control circuit 439 connected to the timing signal reception circuit 436 outputs a control signal to the second synchronization circuit 434 such that the second synchronization circuit 434 changes the gate voltage $V_{g2}$ of the second switching device $SW_2$ from high to low and thereby turn off the second switching device $SW_2$ at time $t_7$ later than time $t_6$ by a phase shift time $T_\phi$. Once the second switching device $SW_2$ is turned off, the current that is stored on the second transmission coil $L_2$ flows into the second resonant capacitor $C_2$, which causes a resonance state and continue to oscillate.

In the present embodiment, the operation as above renders it possible to shift the turn-off phase of the second switching device $SW_2$ by time $T_\phi$ (or by a phase angle $\phi=2\pi T_\phi/T_o$ ($T_o$: operation cycle)) from the turn-off phase of the first switching device $SW_1$ while allowing the first switching device $SW_1$ and the second switching device $SW_2$ to maintain low-loss zero-voltage switching.

In the wireless electrical power supply apparatus 400 according to the present embodiment, the first electrical power supply unit 401 is a single-switch converter actuated by the first switching device $SW_1$, and the second electrical power supply unit 404 is a single-switch converter actuated by the second switching device $SW_2$. In the case of an electric car, the power semiconductor device that is used as the first switching device $SW_1$ is relatively expensive because of requirements for high-speed switching performance of about 90 kHz and low loss and high withstand voltage characteristics. Moreover, the power semiconductor device is normally required to have cooling fins, and therefore providing a plurality of power semiconductor devices requires some space for accommodating the power semiconductor devices. Further, the lower the number of switching devices to be controlled is, the more readily the circuit that controls the timing of switching the switching devices can perform such control; in the case where the wireless electrical power supply apparatus is of a bridge converter type using a plurality of power semiconductors, accurate dead-time control is required for avoiding a malfunction due to two serially connected switching devices in an arm being turned on at the same time. On the other hand, when compared to such a wireless electrical power supply apparatus of a bridge converter type, the wireless electrical power supply apparatus 400 according to the present embodiment can be reduced in cost and size.

Furthermore, in the wireless electrical power supply apparatus 400 according to the present embodiment, the turn-off phase difference control circuit 439 performs phase shift control to compensate for a phase difference in transmission power between the first electrical power supply unit 401 and the second electrical power supply unit 404, which is a major cause of variations of circuit constants and hence changes in transmission power, with the result that such changes in transmission power are reduced to a minimum, thereby ensuring sufficient mass productivity and sufficient compatibility. Thus, the present embodiment renders it possible to enhance the stability of transmission characteristics.

FIG. 12 shows the relationship among phase difference, transmission power, and operating frequency for the wireless electrical power supply apparatus 400. The bold line represents transmission power (left axis), and the broken line represents operating frequency (right axis). As can be appreciated from the figure, the present embodiment renders it possible to control transmission power to range from 0 to the maximum value (in FIG. 12, 4.8 kW) while keeping the operating frequency approximately constant. Thus, the present embodiment renders it possible to enhance the ability to control transmission power.

Furthermore, as can be appreciated from FIG. 12, phase shift control can be performed bidirectionally over the entire range of transmission power, and transmission power gently changes relative to a range of phase differences of from 45 degrees to 315 degrees and therefore can be readily and stably controlled over that range. In particular, in the case of instantaneous control, as in the present embodiment, where the second switching device $SW_2$ is turned off with a delay of time $T_\phi$ after the first switching device $SW_1$ is sensed to be turned off, control is not feasible for an area around a phase difference of zero degrees and an area of negative phase differences but can be stably performed over the entire range of phase differences of from 45 degrees to 315 degrees (i.e., the entire range of transmission power). Further, from the viewpoint of stable control at desired operation points, it is preferable to perform phase shift control over the range of phase differences of from 60 degrees to 300 degrees.

Fifth Embodiment

FIG. 13 illustrates a wireless electrical power supply apparatus 500 according to a fifth embodiment of the present invention. The wireless electrical power supply apparatus 500 includes a first electrical power supply unit 401 connected to a first DC power source 402, a second electrical power supply unit 404 connected to a second DC power source 403, and a control portion 540, and the first DC power source 402 and the second DC power source 403 exchange power therebetween.

The first DC power source 402, the first electrical power supply unit 401, the second DC power source 403, and the second electrical power supply unit 404 are configured in the same manner as in the fourth embodiment and therefore will not be elaborated upon herein.

The control portion 540 includes a first turn-on control circuit (431, 432), a second turn-on control circuit (433, 434), and a cross-phase shift control circuit (541 to 544). The first turn-on control circuit (431, 432) and the second turn-on control circuit (433, 434) are the same as those in the fourth embodiment.

The first turn-on control circuit includes a first resonant voltage sensing circuit 431 and a first synchronization circuit 432. The first resonant voltage sensing circuit 431 is configured to measure an end-to-end voltage $V_{R1}$ of the first transmission coil $L_1$ and thereby detect a first resonant voltage induced by the first transmission coil $L_1$ and the first resonant capacitor $C_1$. The first synchronization circuit 432 is configured to control turn-on of the first switching device $SW_1$ in synchronization with the first resonant voltage such that the first switching device $SW_1$ performs a zero-voltage switching operation, and also configured to maintain a given preset conductive time $T_{ON1}$.

The second turn-on control circuit includes a second resonant voltage sensing circuit 433 and a second synchronization circuit 434. The second resonant voltage sensing circuit 433 is configured to measure an end-to-end voltage $V_{R2}$ of the second transmission coil $L_2$ and thereby detect a second resonant voltage induced by the second transmission coil $L_2$ and the second resonant capacitor $C_2$. The second synchronization circuit 434 is configured to control turn-on of the second switching device $SW_2$ in synchronization with the second resonant voltage such that the second switching device $SW_2$ performs a zero-voltage switching operation.

The cross-phase shift control circuit includes a phase difference detector 541, a phase difference instruction circuit 542, a differential amplifier 543 (corresponding to the "feedback control portion" of the present invention), and a conductive-time-variable portion 544.

The phase difference detector 541 is configured to detect transmission power between the first transmission coil $L_1$ and the second transmission coil $L_2$ and thereby indirectly detect a phase difference. There is a correlation between the transmission power and the phase difference (see FIG. 12), and therefore the phase difference can be indirectly detected and controlled by detecting and controlling the transmission power. Note that instead of using the phase difference detector 541, a phase difference detector configured to directly detect a phase difference may be used.

The phase difference instruction circuit 542 is configured to indicate a target value for transmission power between the first transmission coil $L_1$ and the second transmission coil $L_2$ and thereby indirectly indicate a target phase difference value. Note that instead of using the phase difference instruction circuit 542, a phase difference instruction circuit configured to directly indicate a target phase difference value may be used.

The differential amplifier 543 is configured to compare a detection value obtained by the phase difference detector 541 with a target value indicated by the phase difference instruction circuit 542 and perform phase difference feedback control. In the present embodiment, the detection value and the target value are inputted to a non-inverting input terminal and an inverting input terminal, respectively, of the differential amplifier 543. The differential amplifier 543 outputs a signal corresponding to the difference between these two values to the conductive-time-variable portion 544 as a phase difference control instruction value.

In accordance with the signal received from the differential amplifier 543, the conductive-time-variable portion 544 controls the second synchronization circuit 434 to change a period of time during which to render the second switching device $SW_2$ conductive. Specifically, the conductive-time-variable portion 544 outputs a control signal to the second synchronization circuit 434 so as to cause a predetermined phase difference between turn-off of the first switching device $SW_1$ and turn-off of the second switching device $SW_2$ (phase shift control). In accordance with the control signal, the second synchronization circuit 434 turns off the second switching device $SW_2$.

FIG. 14 is a diagram showing an operation principle of the wireless electrical power supply apparatus 500. The wireless electrical power supply apparatus 500 can be represented by a first arithmetic portion 551, a filter portion 552, a second arithmetic portion 553, a gain setting portion 554, and a voltage-controlled oscillation portion 555.

The first arithmetic portion 551 represents the phase difference detector 541 and calculates a phase difference $\Delta\Phi$ between a phase $\Phi_1$ for the first electrical power supply unit 401 and a phase $\Phi_2$ for the second electrical power supply unit 404 on the basis of transmission power. The phase difference $\Delta\Phi$ between the phase $\Phi_1$ for the first electrical power supply unit 401 and the phase $\Phi_2$ for the second electrical power supply unit 404 may be calculated on the basis of factors other than transmission power. The filter portion 552, which is represented as a transfer function F(S), is a low-pass filter for system stabilization included in the phase difference detector 541.

The second arithmetic portion 553 calculates a difference between an output of the filter portion 552 and a phase difference instruction $\Delta\Phi_r$. The second arithmetic portion 553 represents the differential amplifier 543, and the phase difference instruction $\Delta\Phi_r$ indicates a target phase difference value outputted by the phase difference instruction circuit 542. The gain setting portion 554, which is represented as a block with a K, is an aggregated gain of an entire control loop.

The voltage-controlled oscillation portion 555, which is represented as a block with 1/S, is an aggregation of the conductive-time-variable portion 544, the second synchronization circuit 434, and the second electrical power supply unit 404. The voltage-controlled oscillation portion 555 functions as a voltage-controlled oscillator whose operating frequency changes as a result of a change in conductive time of the second switching device $SW_2$, and therefore also functions as an integrator for operating phases.

From FIG. 14, the phase $\Phi_2$ for the second electrical power supply unit 404 can be expressed by the following equation.

$$\Phi_2 = \frac{KF(s)}{S+KF(s)}\Phi_1 - \frac{K}{S+KF(s)}\Delta\Phi \quad (1)$$

As can be appreciated from equation (1), the wireless electrical power supply apparatus 500 operates such that the phase difference $\Delta\Phi$ between the phase $\Phi_2$ for the second electrical power supply unit 404 and the phase $\Phi_1$ for the first electrical power supply unit 401 is steadily equal to the phase difference instruction $\Delta\Phi_r$ (i.e., the target phase difference value).

Unlike in the fourth embodiment, the wireless electrical power supply apparatus 500 according to the present embodiment does not perform instantaneous control and therefore responds with a delay, but the wireless electrical power supply apparatus 500 eliminates the need for the timing signal transmission circuit 435 and the timing signal reception circuit 436 in the fourth embodiment and therefore is low-cost and resistant to disturbance noise.

Sixth Embodiment

FIG. 15 illustrates a wireless electrical power supply apparatus 600 according to a sixth embodiment of the present invention. The wireless electrical power supply apparatus 600 includes a first electrical power supply unit 401 connected to a first DC power source 402, a second electrical power supply unit 404 connected to a second DC power source 403, and a control portion 660, and the first DC power source 402 and the second DC power source 403 exchange power therebetween.

The first DC power source 402, the first electrical power supply unit 401, the second DC power source 403, and the second electrical power supply unit 404 are configured in the same manner as in the fifth embodiment and therefore will not be elaborated upon herein.

The control portion 660 includes a first turn-on control circuit (431, 432), a second turn-on control circuit (433, 434), and a cross-phase shift control circuit (541 to 543, 661 to 663). The first turn-on control circuit (431, 432) and the second turn-on control circuit (433, 434) are configured in the same manner as in the fifth embodiment.

The cross-phase shift control circuit includes a phase difference detector 541, a phase difference instruction circuit 542, a differential amplifier 543, a resonant current sensing element 661, a resonant current sensing circuit 662, and a conductive-time-variable portion 663. The phase difference detector 541, the phase difference instruction circuit 542, and the differential amplifier 543 are configured in the same manner as in the fifth embodiment.

The resonant current sensing element 661 and the resonant current sensing circuit 662 collectively correspond to the "resonant current sensor" of the present invention. The resonant current sensing element 661 detects a current flowing through the second transmission coil $L_2$ and outputs a detection result to the resonant current sensing circuit 662. Based on the detection result from the resonant current sensing element 661, the resonant current sensing circuit 662 detects a zero cross point of the current flowing through the second transmission coil $L_2$ and outputs a detection result (zero cross signal) to the conductive-time-variable portion 663.

At least during the period in which the second switching device $SW_2$ is conductive, the current flowing through the second transmission coil $L_2$ is equal to a current $I_{SW2}$ flowing through the second switching device $SW_2$. Accordingly, detecting the zero cross point of the current flowing through the second transmission coil $L_2$ is the same as detecting a zero cross point of the current $I_{SW2}$ across the second switching device $SW_2$.

In the second switching device $SW_2$, when the current $I_{SW2}$ reaches the zero cross point, the second anti-parallel diode $D_2$ is turned off, so that the current flowing to the second anti-parallel diode $D_2$ is diverted to the second transistor $Q_2$. That is, the zero cross point of the current $I_{SW2}$ coincides with the time at which the second anti-parallel diode $D_2$ is turned off. Note that the second anti-parallel diode $D_2$ is an internal (parasitic) diode of the second transistor $Q_2$ or a diode independent of the second transistor $Q_2$.

The conductive-time-variable portion 663 is configured to control an on-time of the second transistor $Q_2$ that follows turn-off of the second anti-parallel diode $D_2$. The conductive-time-variable portion 663 receives a zero cross signal from the resonant current sensing circuit 662 and an input signal concerning a phase difference control instruction value (more specifically, a control instruction value for transmission power correlated with a phase difference) from the differential amplifier 543. The control instruction value is intended to cause a detection value obtained by the phase difference detector 541 to approach a target value indicated by the phase difference instruction circuit 542 (for the purpose of feedback control).

Based on these signals, the conductive-time-variable portion 663 calculates an on-time of the second transistor $Q_2$ that follows turn-off of the second anti-parallel diode $D_2$. Moreover, the conductive-time-variable portion 663 generates a timing signal for turning off the second transistor $Q_2$ after a lapse of the on-time. The timing signal is outputted to the second synchronization circuit 434.

In accordance with the timing signal, the second synchronization circuit 434 turns off the second transistor $Q_2$. As a result, phase shift control is performed to cause a predetermined phase difference between turn-off of the first switching device $SW_1$ and turn-off of the second switching device $SW_2$.

FIG. 16 shows a timing chart for components of the wireless electrical power supply apparatus 600. In FIG. 16, waveforms (A) to (H) represent the same signals as those shown in FIG. 11, and waveform (I) represents a timing signal $T_{MOS}$ for controlling an on-time of the second transistor $Q_2$.

Once the voltage $V_{SW2}$ reaches zero at time $t_4$, the second anti-parallel diode $D_2$ of the second switching device $SW_2$ is turned on, with the result that the second switching device $SW_2$ is rendered conductive. During the period $T_{ON2}$ in which the second switching device $SW_2$ is conductive, the current $I_{SW2}$ across the second switching device $SW_2$ is linearly increased.

Once the current $I_{SW2}$ reaches zero at time $t_5'$, the second anti-parallel diode $D_2$ is turned off, with the result that the current flowing to the second anti-parallel diode $D_2$ is diverted to the second transistor $Q_2$. In the control portion 660, the resonant current sensing circuit 662 outputs a zero cross signal to the conductive-time-variable portion 663.

The conductive-time-variable portion 663 calculates an on-time T of the second transistor $Q_2$ that follows the turn-off of the second anti-parallel diode $D_2$, on the basis of the zero cross signal and an input signal from the differential amplifier 543 concerning a control instruction value, and generates a timing signal $T_{MOS}$ concerning the on-time T. The conductive-time-variable portion 663 outputs the generated timing signal $T_{MOS}$ to the second synchronization circuit 434.

The second synchronization circuit 434 turns off the second transistor $Q_2$ at time $t_7$ by changing the gate voltage $V_{g2}$ of the second transistor $Q_2$ from high to low simultaneously with the timing signal $T_{MOS}$ changing from high to low. The rest of the control is the same as in FIG. 11.

As in the fifth embodiment, the wireless electrical power supply apparatus 600 according to the present embodiment eliminates the need for the timing signal transmission circuit 435 and the timing signal reception circuit 436 and therefore is low-cost and resistant to disturbance noise.

Furthermore, the wireless electrical power supply apparatus 600 according to the present embodiment controls the on-time of the second transistor $Q_2$ that follows the turn-off of the second anti-parallel diode $D_2$, and therefore can stably control the second electrical power supply unit 404 compared to a normal method that controls the on-time (conductive time) of the second switching device $SW_2$.

In the method that controls the on-time of the second switching device $SW_2$, the sum of the on-time of the second anti-parallel diode $D_2$ and the on-time of the second transistor $Q_2$ is controlled. In this case, for one sum, there is more than one combination of the on-time of the second anti-parallel diode $D_2$ and the on-time of the second transistor $Q_2$, and therefore the on-time of the second transistor $Q_2$ cannot be uniquely determined.

For example, even when the conductive-time-variable portion 663 calculates the on-time of the second switching device $SW_2$, and the second switching device $SW_2$ is turned off in accordance with that on-time, if the on-time of the second transistor $Q_2$ is out of an appropriate range, the second electrical power supply unit 404 operates unstably. When the second electrical power supply unit 404 operates unstably, the phase difference between the first electrical power supply unit 401 and the second electrical power supply unit 404 fluctuates, resulting in an excess voltage or current applied to the second switching device $SW_2$.

On the other hand, in the present embodiment, the conductive-time-variable portion 663 calculates the on-time T of the second transistor $Q_2$ that follows the turn-off of the second anti-parallel diode $D_2$, and therefore the on-time T can be uniquely determined. Accordingly, in the present embodiment, the on-time T of the second transistor $Q_2$ can be maintained within an appropriate range in accordance with a target phase difference value (or a target transmission power value), so that the second electrical power supply unit 404 can be stably controlled.

Variants

While some embodiments of the wireless electrical power supply apparatus according to the present invention have been described above, the present invention is not limited to the embodiments.

In the first through third embodiments, the first filter circuit 102 and the second filter circuit 105 can be omitted. However, providing the first filter circuit 102 and the second filter circuit 105 renders it possible to stabilize input and output voltages. Moreover, the first DC voltage conversion portion 103 or 303 may be integrated with the bidirectional AC/DC converter serving as the first power source $E_3$.

In the first and second embodiments, the second DC voltage conversion portion 106 can be omitted or configured as a unidirectional DC/DC converter. In either case, during the forward power transmission, the first control circuit 113 or 213 may perform the same control as in the first and second embodiments, and during the reverse power transmission, the first control circuit 113 or 213 may control the second voltage difference by controlling the first DC voltage conversion portion 103 to change the second output voltage $E_1$ (e.g., adjust the second output voltage $E_1$ to be lower or higher than the second input voltage $E_2$).

In the first through third embodiments, the on-time of the first switching device $SW_1$ may be controlled within a tolerable cycle range during the forward power transmission. Moreover, in the first and second embodiments, the on-time of the second switching device $SW_2$ may also be controlled within a tolerable cycle range during the reverse power transmission. For example, when the input voltage can only be controlled within a limited range, there is some difficulty in setting the value of output power to a predetermined target power value, but even in such a case, the value of output power can still be set to the predetermined target power value by changing the on-time of the switching device on the transmitter side within the tolerable cycle range without changing the input voltage. Note that the tolerable cycle range can be suitably set, for example, based on a reference frequency range defined by international standards or suchlike. Moreover, the range within which the on-time can be changed may include a 0% duty cycle for an inactive state.

For example, when the value of the first output voltage $E_2$ is low during the forward power transmission, and desired output power cannot be obtained even by reducing the output (i.e., the first input voltage $E_1$) of the first DC voltage conversion portion 103 to the lower limit of the control range, output power higher than a target power value is provided. In such a case, the on-time of the first switching device $SW_1$ is set shorter than the original setting value within the tolerable cycle range, thereby decreasing the current $I_{L1}$ flowing to the first transmission coil $L_1$. Consequently, the current $I_{L2}$ flowing to the second transmission coil $L_2$ is decreased as well, resulting in reduced transmission power and hence desired output power.

In the first through third embodiments, when the first transmission coil $L_1$ and the second transmission coil $L_2$ are apart at a distance shorter than a prescribed distance (e.g., 45 mm), power transmission may be restricted. Restricting power transmission renders it possible to avoid unstable operations due to the first transmission coil $L_1$ and the second transmission coil $L_2$ being positioned excessively close to each other (in other words, unstable operations caused by no resonant voltage being generated due to lack of leakage inductance).

When power transmission is restricted, unstable operations due to the first transmission coil $L_1$ and the second transmission coil $L_2$ being positioned excessively close to each other may be detected, and distance measuring means for measuring the distance between the first transmission coil $L_1$ and the second transmission coil $L_2$ may be provided (e.g., coils for distance measurement may be provided on the primary and secondary sides). Moreover, the first control instruction 114 and/or the second control instruction 124 may include information about the distance between the first transmission coil $L_1$ and the second transmission coil $L_2$.

For example, when the first transmission coil $L_1$ and the second transmission coil $L_2$ are apart at a distance shorter than a prescribed distance, if desired output power is not obtained during the forward power transmission even by reducing the first input voltage $E_1$ to the lower limit of the control range, the first control circuit 113 or 213 may stop controlling the first DC voltage conversion portion 103 and thereby stop power transmission. Moreover, instead of stopping power transmission, the first control circuit 113 or 213 may set the on-time of the first switching device $SW_1$ shorter than a predetermined value within the tolerable cycle range. This results in reduced transmission power and hence desired output power.

In the fourth embodiment, the timing signal transmission circuit 435 and the timing signal reception circuit 436 may be omitted. Instead of using the timing signal transmission circuit 435 and the timing signal reception circuit 436, a sensing element configured to sense a change in voltage of the first transmission coil $L_1$ by contactless magnetic or electric field sensing may be used. To keep the sensing element from being affected by noise, the sensing element is preferably positioned in the center of the second transmission coil $L_2$ where there is no winding.

In the fourth embodiment, the conductive time $T_{ON1}$ of the first switching device $SW_1$ is set at a fixed value, but instead of this, a conductive time control circuit for the first switching device $SW_1$ may be provided so as to control the conductive time of the first switching device $SW_1$ and thereby set the operating frequency of the first electrical power supply unit 401 to a predetermined value.

In the fourth and fifth embodiments, control is performed to cause a predetermined phase difference between the turn-off of the first switching device $SW_1$ and the turn-off of the second switching device $SW_2$, but control may be performed to cause a predetermined phase difference between the turn-on of the first switching device $SW_1$ and the turn-on of the second switching device $SW_2$. That is, control can be configured to cause a predetermined phase difference between the switching of the first switching device $SW_1$ and the switching of the second switching device $SW_2$. Note that the phase difference control for the turn-on timing needs to be performed such that each of the first and second switching devices $SW_1$ and $SW_2$ performs a zero-voltage switching operation, but there is no such requirement for the phase difference control for the turn-off timing, and hence there is a higher degree of freedom in the phase difference control for the turn-off timing. Thus, from the viewpoint of desired power transmission, control is preferably performed to cause a predetermined phase difference between the turn-off of the first switching device $SW_1$ and the turn-off of the second switching device $SW_2$.

In addition to the cross-phase shift control circuit (435 to 439) for power transmission from the first electrical power supply unit 401 to the second electrical power supply unit 404, the control portion 430 may further include a cross-phase shift control circuit for power transmission from the second electrical power supply unit 404 to the first electrical power supply unit 401.

Similarly, the control portions 540 and 660 may further include cross-phase shift control circuits for power transmission from the second electrical power supply unit 404 to the first electrical power supply unit 401.

Furthermore, the wireless electrical power supply apparatuses 400 to 600 in the fourth through sixth embodiments are configured as bidirectional wireless electrical power supply apparatuses for bidirectional power transmission between the first electrical power supply unit 401 and the second electrical power supply unit 404, but can also be used as unidirectional wireless electrical power supply apparatuses for unidirectional power transmission between the first electrical power supply unit 401 and the second electrical power supply unit 404.

DESCRIPTION OF THE REFERENCE CHARACTERS

- 100, 200, 300, 400, 500, 600 wireless electrical power supply apparatus
- 101, 201, 401 first electrical power supply unit
- 102 first filter circuit
- 103, 303 first DC voltage conversion portion
- 104, 204, 304, 304', 404 second electrical power supply unit
- 105, 105' second filter circuit
- 106, 306 second DC voltage conversion portion
- 110, 210 first control portion
- 111, 431 first resonant voltage sensing circuit
- 112 first synchronization circuit
- 113, 213 first control circuit
- 114 first control instruction
- 115 first detection signal
- 116 first control signal
- 120, 220, 320 second control portion
- 121, 433 second resonant voltage sensing circuit
- 122 second synchronization circuit
- 123, 223, 323 second control circuit
- 124 second control instruction
- 125 second detection signal
- 126, 326 second control signal
- 130 intercommunication signal
- 402 first DC power source
- 403 second DC power source
- 430, 540, 660 control portion
- 432 first synchronization circuit
- 434 second synchronization circuit
- 435 timing signal transmission circuit
- 436 timing signal reception circuit
- 437 sensing circuit
- 438 comparison circuit
- 439 turn-off phase difference control circuit
- 541 phase difference detector
- 542 phase difference instruction circuit
- 543 differential amplifier
- 544, 663 conductive-time-variable portion
- 551 first arithmetic portion
- 552 filter portion
- 553 second arithmetic portion
- 554 gain setting portion
- 555 voltage-controlled oscillation portion
- 661 resonant current sensing element
- 662 resonant current sensing circuit

The invention claimed is:

1. A wireless electrical power supply apparatus comprising:
   a first electrical power supply unit connected to a first DC power source;
   a second electrical power supply unit connected to a second DC power source; and
   a control portion configured to control the first electrical power supply unit and the second electrical power supply unit, wherein,
   the first electrical power supply unit and the second electrical power supply unit transmit power to each other,
   the first electrical power supply unit includes:
     a first transmission coil;
     a first switching device connected in series to the first transmission coil; and
     a first resonant capacitor connected in parallel to either the first transmission coil or the first switching device, or both,
   the second electrical power supply unit includes:
     a second transmission coil;
     a second switching device connected in series to the second transmission coil; and
     a second resonant capacitor connected in parallel to either the second transmission coil or the second switching device, or both, and
   the control portion includes:
     a first turn-on control circuit configured to control turn-on of the first switching device in synchronization with a resonant voltage induced by the first transmission coil and the first resonant capacitor such that the first switching device performs a zero-voltage switching operation, wherein the first turn-on control circuit configured to turn on the first switching device by detecting a zero crossing point of a voltage at both ends of the first transmission coil or the first resonant capacitor;
     a second turn-on control circuit configured to control turn-on of the second switching device in synchronization with a resonant voltage induced by the second transmission coil and the second resonant capacitor such that the second switching device performs a zero-voltage switching operation, wherein the second turn-on control circuit configured to turn on the second switching device by detecting a zero crossing point of a voltage at both ends of the second transmission coil or the second resonant capacitor; and
     a cross-phase shift control circuit configured to perform control to cause a predetermined phase difference between switching of the first switching device and switching of the second switching device, wherein the cross-phase shift control circuit configured to change the phase difference to control transmission power between the first transmission coil and the second transmission coil, wherein the cross-phase shift control circuit performs control to cause the phase difference between turn-off of the first switching device and turn-off of the second switching device, and
   wherein,
     the second switching device includes a transistor and an anti-parallel diode connected in anti-parallel to the transistor, and
     the cross-phase shift control circuit includes:
       a phase difference detector configured to directly or indirectly sense the phase difference;

a phase difference instruction circuit configured to directly or indirectly indicate a target value for the phase difference;
a feedback control portion configured to control the phase difference by feedback control comparing a detection value from the phase difference detector and the target value from the phase difference instruction circuit;
a resonant current sensor configured to detect a zero cross point of a current flowing through the second transmission coil; and
a conductive-time-variable portion configured to control an on-time of the transistor that follows turn-off of the anti-parallel diode, in accordance with a detection result from the resonant current sensor and an output from the feedback control portion.

\* \* \* \* \*